(12) United States Patent
Black et al.

(10) Patent No.: US 9,060,034 B2
(45) Date of Patent: Jun. 16, 2015

(54) SYSTEM AND METHOD OF FILTERING RECOMMENDERS IN A MEDIA ITEM RECOMMENDATION SYSTEM

(75) Inventors: Gary W. Black, Cary, NC (US); Eugene Matthew Farrelly, Cary, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 901 days.

(21) Appl. No.: 11/937,756

(22) Filed: Nov. 9, 2007

(65) Prior Publication Data

US 2009/0125588 A1    May 14, 2009

(51) Int. Cl.
| | | |
|---|---|---|
| H04L 29/08 | (2006.01) | |
| G06Q 10/10 | (2012.01) | |
| G06F 17/30 | (2006.01) | |
| H04L 12/58 | (2006.01) | |

(52) U.S. Cl.
CPC ........ *H04L 67/306* (2013.01); *G06F 17/30761* (2013.01); *H04L 51/12* (2013.01); *G06F 17/30828* (2013.01); *G06Q 10/107* (2013.01)

(58) Field of Classification Search
None
See application file for complete search history.

(56) References Cited

U.S. PATENT DOCUMENTS

| | | |
|---|---|---|
| 4,870,579 A | 9/1989 | Hey |
| 5,568,645 A | 10/1996 | Morris et al. |
| 5,621,456 A | 4/1997 | Florin et al. |
| 5,760,917 A | 6/1998 | Sheridan |
| 5,771,778 A | 6/1998 | MacLean, IV |
| 5,808,612 A | 9/1998 | Merrick et al. |
| 5,956,027 A | 9/1999 | Krishnamurthy |
| 5,960,437 A | 9/1999 | Krawchuk et al. |
| 5,963,916 A | 10/1999 | Kaplan |
| 5,969,283 A | 10/1999 | Looney et al. |
| 6,134,552 A | 10/2000 | Fritz et al. |
| 6,195,654 B1 | 2/2001 | Wachtel |
| 6,195,657 B1 | 2/2001 | Rucker et al. |

(Continued)

FOREIGN PATENT DOCUMENTS

| | | |
|---|---|---|
| CN | 1208930 A | 2/1999 |
| CN | 1586080 A | 2/2005 |

(Continued)

OTHER PUBLICATIONS

"UpTo11.net—Music Recommendations and Search," http://www.upto11.net/, copyright 2005-2006 Upto11.net, printed Feb. 7, 2007, 1 page.

(Continued)

*Primary Examiner* — Ian N Moore
*Assistant Examiner* — Dung B Huynh

(57) ABSTRACT

A system and method of allowing a recipient to control and customize filtering of recommenders in a media item recommendation system. Filtering recommenders allows the recipient to control from which recommenders media item recommendations can be received. Recommenders may be filtered using a tag associated by the recipient with the recommender. The tag may be any attribute. If the recommender is tagged with the attribute matching a current selection criterion established by the recipient, media item recommendations from the recommender may be sent to the recipient. If the recommender is not tagged with the attribute matching the current selection criterion, the recommender is filtered out and the media item recommendation from the recommender may not be sent to the recipient. The recipient may define the current selection criterion by setting a presentation channel.

25 Claims, 18 Drawing Sheets

(56) References Cited

U.S. PATENT DOCUMENTS

| | | | |
|---|---|---|---|
| 6,266,649 B1 | 7/2001 | Linden et al. | |
| 6,314,420 B1 | 11/2001 | Lang et al. | |
| 6,317,722 B1 | 11/2001 | Jacobi et al. | |
| 6,353,823 B1 | 3/2002 | Kumar | |
| 6,388,714 B1 | 5/2002 | Schein et al. | |
| 6,438,579 B1 | 8/2002 | Hosken | |
| 6,480,885 B1 | 11/2002 | Olivier | |
| 6,498,955 B1 | 12/2002 | McCarthy et al. | |
| 6,507,727 B1 | 1/2003 | Henrick | |
| 6,526,411 B1 | 2/2003 | Ward | |
| 6,549,768 B1 | 4/2003 | Fraccaroli | |
| 6,567,797 B1 | 5/2003 | Schuetze et al. | |
| 6,578,072 B2 | 6/2003 | Watanabe et al. | |
| 6,587,127 B1 | 7/2003 | Leeke et al. | |
| 6,587,850 B2 | 7/2003 | Zhai | |
| 6,606,657 B1 | 8/2003 | Zilberstein et al. | |
| 6,609,253 B1 | 8/2003 | Swix et al. | |
| 6,615,208 B1 | 9/2003 | Behrens et al. | |
| 6,618,593 B1 | 9/2003 | Drutman et al. | |
| 6,629,104 B1 | 9/2003 | Parulski et al. | |
| 6,636,836 B1 | 10/2003 | Pyo | |
| 6,654,786 B1* | 11/2003 | Fox et al. | 709/203 |
| 6,662,231 B1* | 12/2003 | Drosset et al. | 709/229 |
| 6,670,537 B2 | 12/2003 | Hughes et al. | |
| 6,694,482 B1 | 2/2004 | Arellano et al. | |
| 6,757,517 B2 | 6/2004 | Chang | |
| 6,757,691 B1 | 6/2004 | Welsh et al. | |
| 6,795,808 B1 | 9/2004 | Strubbe et al. | |
| 6,801,909 B2 | 10/2004 | Delgado et al. | |
| 6,834,195 B2 | 12/2004 | Brandenberg et al. | |
| 6,865,565 B2* | 3/2005 | Rainsberger et al. | 706/47 |
| 6,865,600 B1 | 3/2005 | Brydon et al. | |
| 6,888,457 B2 | 5/2005 | Wilkinson et al. | |
| 6,895,084 B1 | 5/2005 | Saylor et al. | |
| 6,904,264 B1 | 6/2005 | Frantz | |
| 6,912,528 B2 | 6/2005 | Homer | |
| 6,941,275 B1 | 9/2005 | Swierczek | |
| 6,941,324 B2* | 9/2005 | Plastina et al. | 707/104.1 |
| 6,947,922 B1* | 9/2005 | Glance | 705/26.1 |
| 6,973,475 B2 | 12/2005 | Kenyon et al. | |
| 6,976,228 B2 | 12/2005 | Bernhardson | |
| 6,986,136 B2 | 1/2006 | Simpson et al. | |
| 6,987,221 B2 | 1/2006 | Platt | |
| 6,990,453 B2 | 1/2006 | Wang et al. | |
| 7,013,301 B2 | 3/2006 | Holm et al. | |
| 7,035,871 B2 | 4/2006 | Hunt et al. | |
| 7,047,030 B2 | 5/2006 | Forsyth | |
| 7,047,406 B2 | 5/2006 | Schleicher et al. | |
| 7,072,846 B1 | 7/2006 | Robinson | |
| 7,072,886 B2 | 7/2006 | Salmenkaita et al. | |
| 7,075,000 B2 | 7/2006 | Gang et al. | |
| 7,076,553 B2 | 7/2006 | Chan et al. | |
| 7,080,139 B1 | 7/2006 | Briggs et al. | |
| 7,089,248 B1 | 8/2006 | King et al. | |
| 7,096,234 B2 | 8/2006 | Plastina et al. | |
| 7,120,619 B2 | 10/2006 | Drucker et al. | |
| 7,139,757 B1 | 11/2006 | Apollonsky et al. | |
| 7,145,678 B2 | 12/2006 | Simpson et al. | |
| 7,171,174 B2 | 1/2007 | Ellis et al. | |
| 7,177,872 B2 | 2/2007 | Schwesig et al. | |
| 7,219,145 B2 | 5/2007 | Chmaytelli et al. | |
| 7,222,187 B2* | 5/2007 | Yeager et al. | 709/237 |
| 7,240,358 B2 | 7/2007 | Horn et al. | |
| 7,283,992 B2 | 10/2007 | Liu et al. | |
| 7,296,032 B1* | 11/2007 | Beddow | 1/1 |
| 7,296,284 B1 | 11/2007 | Price et al. | |
| 7,305,449 B2 | 12/2007 | Simpson et al. | |
| 7,340,481 B1 | 3/2008 | Baer et al. | |
| 7,366,522 B2 | 4/2008 | Thomas | |
| 7,437,364 B1 | 10/2008 | Fredricksen et al. | |
| 7,441,041 B2 | 10/2008 | Williams et al. | |
| 7,444,339 B2 | 10/2008 | Matsuda et al. | |
| 7,463,890 B2 | 12/2008 | Herz et al. | |
| 7,469,283 B2 | 12/2008 | Eyal et al. | |
| 7,496,623 B2 | 2/2009 | Szeto et al. | |
| 7,509,291 B2* | 3/2009 | McBride et al. | 705/60 |
| 7,512,658 B2 | 3/2009 | Brown et al. | |
| 7,523,156 B2 | 4/2009 | Giacalone, Jr. | |
| 7,526,181 B2 | 4/2009 | Burges et al. | |
| 7,548,915 B2 | 6/2009 | Ramer et al. | |
| 7,548,934 B1 | 6/2009 | Platt et al. | |
| 7,590,546 B2 | 9/2009 | Chuang | |
| 7,593,921 B2 | 9/2009 | Goronzy et al. | |
| 7,594,246 B1 | 9/2009 | Billmaier et al. | |
| 7,614,006 B2 | 11/2009 | Molander | |
| 7,623,843 B2 | 11/2009 | Squibbs | |
| 7,627,644 B2 | 12/2009 | Slack-Smith | |
| 7,644,166 B2* | 1/2010 | Appelman et al. | 709/229 |
| 7,653,654 B1 | 1/2010 | Sundaresan | |
| 7,676,753 B2 | 3/2010 | Bedingfield | |
| 7,680,959 B2 | 3/2010 | Svendsen | |
| 7,720,871 B2 | 5/2010 | Rogers et al. | |
| 7,725,494 B2 | 5/2010 | Rogers et al. | |
| 7,730,216 B1 | 6/2010 | Issa et al. | |
| RE41,450 E | 7/2010 | Briggs et al. | |
| 7,751,773 B2 | 7/2010 | Linden | |
| 7,761,399 B2* | 7/2010 | Evans | 706/55 |
| 7,765,192 B2 | 7/2010 | Svendsen | |
| 7,805,129 B1 | 9/2010 | Issa et al. | |
| 7,827,110 B1 | 11/2010 | Wieder | |
| 7,856,360 B2 | 12/2010 | Kramer et al. | |
| 7,865,522 B2 | 1/2011 | Purdy et al. | |
| 7,970,922 B2 | 6/2011 | Svendsen | |
| 8,030,564 B2 | 10/2011 | Komori et al. | |
| 8,051,130 B2 | 11/2011 | Logan et al. | |
| 8,059,646 B2* | 11/2011 | Svendsen et al. | 370/390 |
| 8,151,304 B2 | 4/2012 | Nathan et al. | |
| 8,285,776 B2 | 10/2012 | Svendsen | |
| 8,463,893 B2* | 6/2013 | Clark | 709/224 |
| 2001/0013009 A1 | 8/2001 | Greening et al. | |
| 2001/0021914 A1 | 9/2001 | Jacobi et al. | |
| 2001/0025259 A1 | 9/2001 | Rouchon | |
| 2001/0036224 A1 | 11/2001 | Demello et al. | |
| 2002/0032723 A1 | 3/2002 | Johnson et al. | |
| 2002/0049686 A1 | 4/2002 | Chuang et al. | |
| 2002/0052207 A1 | 5/2002 | Hunzinger | |
| 2002/0052674 A1 | 5/2002 | Chang et al. | |
| 2002/0052873 A1 | 5/2002 | Delgado et al. | |
| 2002/0052925 A1 | 5/2002 | Kim et al. | |
| 2002/0082901 A1 | 6/2002 | Dunning et al. | |
| 2002/0087382 A1* | 7/2002 | Tiburcio | 705/9 |
| 2002/0087496 A1 | 7/2002 | Stirpe et al. | |
| 2002/0103796 A1 | 8/2002 | Hartley | |
| 2002/0108112 A1 | 8/2002 | Wallace et al. | |
| 2002/0116533 A1 | 8/2002 | Holliman et al. | |
| 2002/0138836 A1 | 9/2002 | Zimmerman | |
| 2002/0144259 A1 | 10/2002 | Gutta et al. | |
| 2002/0165793 A1 | 11/2002 | Brand et al. | |
| 2002/0174426 A1 | 11/2002 | Gutta et al. | |
| 2002/0178057 A1 | 11/2002 | Bertram et al. | |
| 2002/0194325 A1 | 12/2002 | Chmaytelli et al. | |
| 2002/0194356 A1 | 12/2002 | Chan et al. | |
| 2002/0198882 A1 | 12/2002 | Linden et al. | |
| 2003/0001907 A1 | 1/2003 | Bergsten et al. | |
| 2003/0005074 A1 | 1/2003 | Herz et al. | |
| 2003/0014407 A1 | 1/2003 | Blatter et al. | |
| 2003/0018799 A1* | 1/2003 | Eyal | 709/231 |
| 2003/0046399 A1 | 3/2003 | Boulter et al. | |
| 2003/0054810 A1 | 3/2003 | Chen et al. | |
| 2003/0055516 A1 | 3/2003 | Gang et al. | |
| 2003/0055657 A1 | 3/2003 | Yoshida et al. | |
| 2003/0066068 A1 | 4/2003 | Gutta et al. | |
| 2003/0069806 A1 | 4/2003 | Konomi et al. | |
| 2003/0084044 A1 | 5/2003 | Simpson et al. | |
| 2003/0084086 A1 | 5/2003 | Simpson et al. | |
| 2003/0084151 A1 | 5/2003 | Simpson et al. | |
| 2003/0089218 A1 | 5/2003 | Gang et al. | |
| 2003/0097186 A1 | 5/2003 | Gutta et al. | |
| 2003/0105682 A1 | 6/2003 | Dicker et al. | |
| 2003/0115167 A1 | 6/2003 | Sharif et al. | |
| 2003/0135513 A1 | 7/2003 | Quinn et al. | |
| 2003/0137531 A1 | 7/2003 | Katinsky et al. | |
| 2003/0147624 A1 | 8/2003 | Trajkovic et al. | |
| 2003/0149581 A1 | 8/2003 | Chaudhri et al. | |

(56) References Cited

U.S. PATENT DOCUMENTS

| | | |
|---|---|---|
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1* | 10/2003 | Hoch ................................ 707/3 |
| 2003/0225836 A1 | 12/2003 | Lee et al. |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0064306 A1 | 4/2004 | Wolf et al. |
| 2004/0073919 A1 | 4/2004 | Gutta |
| 2004/0088271 A1* | 5/2004 | Cleckler et al. ................ 705/408 |
| 2004/0088355 A1 | 5/2004 | Hagan et al. |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1* | 10/2004 | Ryan et al. ..................... 709/229 |
| 2004/0216108 A1 | 10/2004 | Robbin |
| 2004/0221308 A1* | 11/2004 | Cuttner et al. ................... 725/46 |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1* | 12/2004 | Banister et al. ................ 709/206 |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1* | 6/2005 | Badros et al. ..................... 707/3 |
| 2005/0138198 A1 | 6/2005 | May |
| 2005/0154608 A1 | 7/2005 | Paulson et al. |
| 2005/0154764 A1* | 7/2005 | Riegler et al. ............... 707/104.1 |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0246420 A1* | 11/2005 | Little ............................ 709/204 |
| 2005/0251455 A1 | 11/2005 | Boesen |
| 2005/0251566 A1 | 11/2005 | Weel |
| 2005/0251807 A1 | 11/2005 | Weel |
| 2005/0256756 A1 | 11/2005 | Lam et al. |
| 2005/0256866 A1* | 11/2005 | Lu et al. ............................ 707/5 |
| 2005/0267944 A1 | 12/2005 | Little, II |
| 2005/0278377 A1 | 12/2005 | Mirrashidi |
| 2005/0278758 A1* | 12/2005 | Bodlaender ..................... 725/89 |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1* | 1/2006 | Khedouri et al. .............. 386/124 |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0031340 A1* | 2/2006 | Mathew et al. ................ 709/206 |
| 2006/0048059 A1 | 3/2006 | Etkin |
| 2006/0053080 A1* | 3/2006 | Edmonson et al. .............. 705/59 |
| 2006/0059260 A1 | 3/2006 | Kelly et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0130120 A1* | 6/2006 | Brandyberry et al. ........ 725/136 |
| 2006/0143236 A1* | 6/2006 | Wu .......................... 707/104.1 |
| 2006/0156242 A1 | 7/2006 | Bedingfield |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0184558 A1 | 8/2006 | Martin et al. |
| 2006/0190616 A1 | 8/2006 | Mayerhofer et al. |
| 2006/0195479 A1 | 8/2006 | Spiegelman et al. |
| 2006/0195480 A1* | 8/2006 | Spiegelman et al. ...... 707/104.1 |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0218613 A1 | 9/2006 | Bushnell |
| 2006/0224757 A1 | 10/2006 | Fang et al. |
| 2006/0224971 A1 | 10/2006 | Paulin et al. |
| 2006/0227673 A1 | 10/2006 | Yamashita et al. |
| 2006/0239131 A1 | 10/2006 | Nathan et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1* | 11/2006 | Jacoby et al. .................... 725/46 |
| 2006/0273155 A1 | 12/2006 | Thackston |
| 2006/0277098 A1 | 12/2006 | Chung et al. |
| 2006/0282304 A1* | 12/2006 | Bedard et al. .................... 705/10 |
| 2006/0282776 A1* | 12/2006 | Farmer et al. .................. 715/719 |
| 2006/0282856 A1 | 12/2006 | Errico et al. |
| 2006/0288041 A1 | 12/2006 | Plastina et al. |
| 2006/0293909 A1* | 12/2006 | Miyajima et al. ................. 705/1 |
| 2007/0005793 A1 | 1/2007 | Miyoshi et al. |
| 2007/0008927 A1 | 1/2007 | Herz et al. |
| 2007/0014536 A1* | 1/2007 | Hellman ........................... 386/94 |
| 2007/0022437 A1 | 1/2007 | Gerken |
| 2007/0028171 A1* | 2/2007 | MacLaurin ..................... 715/705 |
| 2007/0033292 A1 | 2/2007 | Sull et al. |
| 2007/0043766 A1 | 2/2007 | Nicholas et al. |
| 2007/0044010 A1 | 2/2007 | Sull et al. |
| 2007/0064626 A1* | 3/2007 | Evans ............................ 370/254 |
| 2007/0078714 A1 | 4/2007 | Ott, IV et al. |
| 2007/0078832 A1 | 4/2007 | Ott et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1* | 4/2007 | Sprosts et al. ................... 726/22 |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1* | 5/2007 | Sighart et al. .................... 707/10 |
| 2007/0106693 A1 | 5/2007 | Houh et al. |

(56) References Cited

U.S. PATENT DOCUMENTS

| | | | |
|---|---|---|---|
| 2007/0118425 A1 | 5/2007 | Yruski et al. | |
| 2007/0118657 A1 | 5/2007 | Kreitzer et al. | |
| 2007/0118802 A1 | 5/2007 | Gerace et al. | |
| 2007/0118853 A1 | 5/2007 | Kreitzer et al. | |
| 2007/0118873 A1 | 5/2007 | Houh et al. | |
| 2007/0130008 A1* | 6/2007 | Brown et al. | 705/14 |
| 2007/0130012 A1 | 6/2007 | Yruski et al. | |
| 2007/0152502 A1 | 7/2007 | Kinsey | |
| 2007/0155416 A1 | 7/2007 | Donnellan | |
| 2007/0162502 A1 | 7/2007 | Thomas et al. | |
| 2007/0192717 A1 | 8/2007 | Gong et al. | |
| 2007/0195373 A1 | 8/2007 | Singh | |
| 2007/0198485 A1 | 8/2007 | Ramer et al. | |
| 2007/0199014 A1* | 8/2007 | Clark et al. | 725/30 |
| 2007/0214182 A1 | 9/2007 | Rosenberg | |
| 2007/0214259 A1* | 9/2007 | Ahmed et al. | 709/224 |
| 2007/0220081 A1 | 9/2007 | Hyman | |
| 2007/0233736 A1* | 10/2007 | Xiong et al. | 707/104.1 |
| 2007/0238427 A1* | 10/2007 | Kraft et al. | 455/184.1 |
| 2007/0239724 A1 | 10/2007 | Ramer et al. | |
| 2007/0244880 A1 | 10/2007 | Martin et al. | |
| 2007/0245245 A1* | 10/2007 | Blue et al. | 715/739 |
| 2007/0264982 A1* | 11/2007 | Nguyen et al. | 455/414.1 |
| 2007/0265870 A1 | 11/2007 | Song et al. | |
| 2007/0269169 A1 | 11/2007 | Stix et al. | |
| 2007/0277202 A1 | 11/2007 | Lin et al. | |
| 2007/0282949 A1 | 12/2007 | Fischer et al. | |
| 2007/0288546 A1 | 12/2007 | Rosenberg | |
| 2007/0299873 A1 | 12/2007 | Jones et al. | |
| 2007/0299874 A1 | 12/2007 | Neumann et al. | |
| 2007/0299978 A1 | 12/2007 | Neumann et al. | |
| 2007/0300260 A1 | 12/2007 | Holm et al. | |
| 2008/0005179 A1* | 1/2008 | Friedman et al. | 707/104.1 |
| 2008/0005688 A1 | 1/2008 | Najdenovski | |
| 2008/0010372 A1 | 1/2008 | Khedouri et al. | |
| 2008/0016098 A1* | 1/2008 | Frieden et al. | 707/102 |
| 2008/0016205 A1 | 1/2008 | Svendsen | |
| 2008/0032723 A1 | 2/2008 | Rosenberg | |
| 2008/0033959 A1* | 2/2008 | Jones | 707/9 |
| 2008/0040313 A1 | 2/2008 | Schachter | |
| 2008/0046948 A1 | 2/2008 | Verosub | |
| 2008/0052371 A1* | 2/2008 | Partovi et al. | 709/217 |
| 2008/0052380 A1 | 2/2008 | Morita et al. | |
| 2008/0052630 A1* | 2/2008 | Rosenbaum et al. | 715/738 |
| 2008/0055427 A1 | 3/2008 | Wendelrup | |
| 2008/0059422 A1 | 3/2008 | Tenni et al. | |
| 2008/0059576 A1 | 3/2008 | Liu et al. | |
| 2008/0085769 A1 | 4/2008 | Lutnick et al. | |
| 2008/0086379 A1 | 4/2008 | Dion et al. | |
| 2008/0091771 A1* | 4/2008 | Allen et al. | 709/203 |
| 2008/0092062 A1 | 4/2008 | Motsinger | |
| 2008/0120501 A1 | 5/2008 | Jannink et al. | |
| 2008/0133601 A1 | 6/2008 | Martin Cervera et al. | |
| 2008/0133763 A1 | 6/2008 | Clark et al. | |
| 2008/0134039 A1 | 6/2008 | Fischer et al. | |
| 2008/0134043 A1 | 6/2008 | Georgis et al. | |
| 2008/0134053 A1 | 6/2008 | Fischer | |
| 2008/0141136 A1* | 6/2008 | Ozzie et al. | 715/723 |
| 2008/0147482 A1 | 6/2008 | Messing et al. | |
| 2008/0147711 A1 | 6/2008 | Spiegelman et al. | |
| 2008/0147876 A1 | 6/2008 | Campbell et al. | |
| 2008/0160983 A1 | 7/2008 | Poplett et al. | |
| 2008/0163284 A1* | 7/2008 | Martinez et al. | 725/25 |
| 2008/0175103 A1 | 7/2008 | Nakamura et al. | |
| 2008/0176562 A1 | 7/2008 | Howard | |
| 2008/0181536 A1 | 7/2008 | Linden | |
| 2008/0189336 A1* | 8/2008 | Prihodko | 707/104.1 |
| 2008/0189391 A1 | 8/2008 | Koberstein et al. | |
| 2008/0189655 A1* | 8/2008 | Kol et al. | 715/808 |
| 2008/0195657 A1 | 8/2008 | Naaman et al. | |
| 2008/0195664 A1* | 8/2008 | Maharajh et al. | 707/104.1 |
| 2008/0208823 A1 | 8/2008 | Hicken | |
| 2008/0209013 A1 | 8/2008 | Weel | |
| 2008/0228945 A1 | 9/2008 | Yoon et al. | |
| 2008/0235632 A1 | 9/2008 | Holmes | |
| 2008/0242221 A1 | 10/2008 | Shapiro et al. | |
| 2008/0242280 A1 | 10/2008 | Shapiro et al. | |
| 2008/0243733 A1 | 10/2008 | Black | |
| 2008/0244681 A1* | 10/2008 | Gossweiler et al. | 725/133 |
| 2008/0250067 A1* | 10/2008 | Svendsen | 707/104.1 |
| 2008/0250312 A1 | 10/2008 | Curtis | |
| 2008/0250332 A1 | 10/2008 | Farrell et al. | |
| 2008/0270561 A1 | 10/2008 | Tang et al. | |
| 2008/0276279 A1* | 11/2008 | Gossweiler et al. | 725/46 |
| 2008/0288588 A1* | 11/2008 | Andam et al. | 709/204 |
| 2008/0301118 A1 | 12/2008 | Chien et al. | |
| 2008/0301186 A1 | 12/2008 | Svendsen | |
| 2008/0301187 A1 | 12/2008 | Svendsen | |
| 2008/0301240 A1 | 12/2008 | Svendsen | |
| 2008/0301241 A1* | 12/2008 | Svendsen | |
| 2008/0306826 A1* | 12/2008 | Kramer et al. | 705/14 |
| 2008/0307462 A1 | 12/2008 | Beetcher et al. | |
| 2008/0307463 A1 | 12/2008 | Beetcher et al. | |
| 2008/0313541 A1* | 12/2008 | Shafton et al. | 715/725 |
| 2008/0319833 A1 | 12/2008 | Svendsen | |
| 2009/0006368 A1 | 1/2009 | Mei et al. | |
| 2009/0006374 A1 | 1/2009 | Kim et al. | |
| 2009/0007198 A1 | 1/2009 | Lavender et al. | |
| 2009/0013347 A1 | 1/2009 | Ahanger et al. | |
| 2009/0042545 A1 | 2/2009 | Avital | |
| 2009/0046101 A1 | 2/2009 | Askey et al. | |
| 2009/0048992 A1 | 2/2009 | Svendsen et al. | |
| 2009/0049030 A1 | 2/2009 | Svendsen et al. | |
| 2009/0049045 A1 | 2/2009 | Askey et al. | |
| 2009/0055385 A1 | 2/2009 | Jeon et al. | |
| 2009/0055396 A1 | 2/2009 | Svendsen et al. | |
| 2009/0055467 A1 | 2/2009 | Petersen | |
| 2009/0055759 A1 | 2/2009 | Svendsen | |
| 2009/0069911 A1* | 3/2009 | Stefik | 700/94 |
| 2009/0069912 A1* | 3/2009 | Stefik | 700/94 |
| 2009/0069913 A1* | 3/2009 | Stefik | 700/94 |
| 2009/0070184 A1 | 3/2009 | Svendsen | |
| 2009/0070185 A1 | 3/2009 | Farrelly | |
| 2009/0070350 A1* | 3/2009 | Wang | 707/100 |
| 2009/0076881 A1 | 3/2009 | Svendsen | |
| 2009/0077041 A1 | 3/2009 | Eyal et al. | |
| 2009/0077052 A1 | 3/2009 | Farrelly | |
| 2009/0077084 A1 | 3/2009 | Svendsen | |
| 2009/0077124 A1* | 3/2009 | Spivack et al. | 707/103 Y |
| 2009/0077220 A1 | 3/2009 | Svendsen et al. | |
| 2009/0083116 A1 | 3/2009 | Svendsen | |
| 2009/0083117 A1 | 3/2009 | Svendsen et al. | |
| 2009/0083362 A1 | 3/2009 | Svendsen | |
| 2009/0083541 A1 | 3/2009 | Levine | |
| 2009/0089288 A1 | 4/2009 | Petersen | |
| 2009/0093300 A1 | 4/2009 | Lutnick et al. | |
| 2009/0094248 A1 | 4/2009 | Petersen | |
| 2009/0106082 A1 | 4/2009 | Senti et al. | |
| 2009/0111438 A1 | 4/2009 | Chan | |
| 2009/0119294 A1 | 5/2009 | Purdy et al. | |
| 2009/0129671 A1 | 5/2009 | Hu et al. | |
| 2009/0178003 A1 | 7/2009 | Fiedler | |
| 2009/0183091 A1 | 7/2009 | Sharpe et al. | |
| 2009/0222392 A1 | 9/2009 | Martin et al. | |
| 2009/0276709 A1* | 11/2009 | Venneman et al. | 715/716 |
| 2010/0031366 A1 | 2/2010 | Knight et al. | |
| 2010/0185732 A1 | 7/2010 | Hyman | |
| 2011/0016483 A1 | 1/2011 | Opdycke | |
| 2011/0034121 A1 | 2/2011 | Ng et al. | |
| 2011/0184899 A1 | 7/2011 | Gadanho et al. | |
| 2011/0320231 A1* | 12/2011 | Podgurny et al. | 705/7.13 |
| 2012/0143956 A1 | 6/2012 | Svendsen | |
| 2013/0031216 A1* | 1/2013 | Willis et al. | 709/219 |

FOREIGN PATENT DOCUMENTS

| | | |
|---|---|---|
| CN | 1841385 A | 10/2006 |
| EP | 0898278 A2 | 2/1999 |
| EP | 1536352 A1 | 6/2005 |
| EP | 1707917 A2 | 10/2006 |
| EP | 1835455 A1 | 9/2007 |
| EP | 1323318 B1 | 12/2010 |
| EP | 2312871 A1 | 4/2011 |
| GB | 2372850 A | 9/2002 |

(56) References Cited

FOREIGN PATENT DOCUMENTS

| | | | |
|---|---|---|---|
| GB | 2397205 A | 7/2004 |
| GB | 2435371 A | 8/2007 |
| JP | 2002-196778 A | 7/2002 |
| JP | 2005-321668 | 11/2005 |
| JP | 2007-011452 A | 1/2007 |
| JP | 2008-027042 A | 2/2008 |
| KR | 20020007934 A | 1/2002 |
| WO | 01/84353 A3 | 11/2001 |
| WO | 02/21335 A1 | 3/2002 |
| WO | 02/21864 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006/017622 A2 | 2/2006 |
| WO | 2006/075032 A1 | 7/2006 |
| WO | 2006/109066 A2 | 10/2006 |
| WO | 2006/126135 A2 | 11/2006 |
| WO | 2007/044549 A2 | 4/2007 |
| WO | 2007/069004 A1 | 6/2007 |
| WO | 2007/092053 A1 | 8/2007 |

OTHER PUBLICATIONS

"Webjay—Playlist Community," http://www.webjay.org/, copyright 2006 Yahoo! Inc., printed Feb. 7, 2007, 5 pages.
"Wired News:," http://www.wired.com/news/digiwoo/1,57634-0.html, copyright 2005 Lycos, Inc., printed Oct. 9, 2006, 3 pages.
"Not safe for work—Wikipedia, the free encyclopedia," http://en.wikipedia.org/wiki/Work_safe, printed Nov. 8, 2007, 2 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Yahoo Music Jukebox—Wikipedia, the free encyclopedia," http://en.wikipedia.org/wiki/Yahoo_music_engine, printed Aug. 8, 2006, 1 page.
"LAUNCHcast Radio—Yahoo! Messenger," http://messenger.com/launch.php, copyright 2007 Yahoo! Inc., printed Nov. 8, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
"Zune.net—How-To-Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Apple—iPod classic," http://www.apple.com/ipodclassic/, printed Oct. 26, 2007, 1 page.
"BetterPropaganda—Free MP3s and music videos.," http://www.betterpropaganda.com/, copyright 2004-2005 betterPropaganda, printed Feb. 7, 2007, 4 pages.
"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.
"Bluetooth.com—Learn," http://www.bluetooth.com/Bluetooth/Learn/, copyright 2007 Bluetooth SIG, Inc., printed Oct. 26, 2007, 1 page.
"ChoiceStream Technology Brief, Review of Personalization Technologies: Collaborative Filtering vs. ChoiceStream's Attributized Bayesian Choice Modeling," 13 pages.
"The Classic TV Database—Your Home for Classic TV!—www.classic-tv.com," http://www.classic-tv.com, copyright The Classic TV Database—www.classic-tv.com, printed Feb. 7, 2007, 3 pages.

"Digital Tech Life >> Download of the Week," http://www.digitaltechlife.com/category/download-of-the-week/, printed Feb. 16, 2007, 9 pages.
"MP3 music download website, eMusic," http://www.emusic.com/, copyright 2007 eMusic.com Inc., printed Feb. 7, 2007, 1 page.
"GenieLab::Music Recommendation System," http://web.archive.org/web/20060813000442/http://genielab.com/, copyright 2005 GenieLab, LLC, printed Oct. 26, 2007, 1 page.
"The Daily Barometer—GenieLab.com grants music lovers' wishes," http://media.barometer.orst.edu/home/index.cfm?event=displayArticlePrinterFriendly&uSt . . . , copyright 2007 The Daily Barometer, printed Feb. 16, 2007, 2 pages.
"Gracenote Playlist," Revised Dec. 29, 2005, 2 pages.
"Gracenote Playlist Plus," Revised Dec. 29, 2005, 2 pages.
"Gracenote," http://www.gracenote.com, printed Feb. 7, 2007, 1 page.
"IEEE 802.11—Wikipedia, the free encyclopedia," http://en.wikipedia.org/wiki/IEEE_802.11, printed Oct. 26, 2007, 5 pages.
"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Apple—iPod + iTunes," http://www.apple.com/itunes/, copyright 2007 Paramount Pictures, printed Feb. 7, 2007, 2 pages.
"Last.fm—Wikipedia, the free encyclopedia," http://en.wikipedia.org/wiki/Last.fm, printed Aug. 8, 2006, 7 pages.
"LimeWire—Wikipedia, the free encyclopedia," http://en.wikipedia.org/wiki/LimeWire, printed Aug. 8, 2006, 2 pages.
"Liveplasma music, movies, search engine and discovery engine," http://www.liveplasma.com, printed May 17, 2007, 1 page.
"Loomia—Personalized Recommendations for Media, Content and Retail Sites," http://www.loomia.com/, copyright 2006-2007 Loomia Inc., printed Feb. 7, 2007, 2 pages.
"Mercora—Music Search and Internet Radio Network," http://www.mercora.com/overview.asp, copyright 2004-2006 Mercora, Inc., printed Aug. 8, 2006, 1 page.
"Mercora—Music Search and Internet Radio Network," http://www.mercora.com/v6/_front/web.jsp, printed Feb. 7, 2007, 1 page.
"Outlook Home Page—Microsoft Office Online," http://office.microsoft.com/en-us/outlook/default.aspx, copyright 2007 Microsoft Corporation, printed Nov. 8, 2007, 1 page.
"Welcome to the Musicmatch Guide," http://www.mmguide.musicmatch.com/, copyright 2001-2004 Musicmatch, Inc., printed Feb. 7, 2007, 1 page.
"Mongomusic.com—The Best Download mp3 Resources and Information. This website is for sale!," http://www.mongomusic.com/, printed May 17, 2007, 2 pages.
"Thunderbird—Reclaim your inbox," http://www.mozilla.com/en-US/thunderbird/, copyright 2005-2007 Mozilla, printed Nov. 8, 2007, 2 pages.
"Take a look at the Future of Mobile Music :: Music Guru," http://www.symbian-freak.com/news/006/02/music_guru.htm, copyright 2005 Symbian freak, printed Feb. 7, 2007, 3 pages.
"Music Recommendations 1.0—MacUpdate," http://www.macupdate.com/info.php/id/19575, printed Feb. 16, 2007, 1 page.
"MusicGremlin," http://www.musicgremlin.com/StaticContent.aspx?id=3, copyright 2005, 2006, 2007 MusicGremlin, Inc., printed Oct. 26, 2007, 1 page.
"MusicIP—The Music Search Engine," http://www.musicip.com/, copyright 2006-2007 MusicIP Corporation, printed Feb. 7, 2007, 1 page.
"Digital Music News," http://www.digitalmusicnews.com/results?title=musicstrands, copyright 2003-6 Digital Music News, printed Aug. 8, 2006, 5 pages.
"Musicstrands.com Because Music is Social," copyright 2006 MusicStrands, Inc., 2 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.
"MyStrands Download," http://www.mystrands.com/overview.vm, printed Feb. 7, 2007, 3 pages.

(56) References Cited

OTHER PUBLICATIONS

"Napster—All The Music You Want," http://www.napster.com/using_napster/all_the_music_you_want.html, copyright 2003-2006 Napster, LLC, printed Feb. 7, 2007, 2 pages.
"Try Napster free for 7 Days—Play and download music without paying per song.," http://www.napster.com/choose/index.html, copyright 2003-2007 Napster, LLC, printed Feb. 7, 2007, 1 page.
"FAQ," http://blog.pandora.com/faq/, copyright 2005-2006 Pandora Media, Inc., printed Aug. 8, 2006, 20 pages.
"Pandora Internet Radio—Find New Music, Listen to Free Web Radio," http://www.pandora.com/, copyright 2005-2007 Pandora Media, Inc., printed Feb. 7, 2007, 1 page.
"Pandora Radio—Listen to Free Internet Radio, Find New Music," http://www.pandora.com/mgp, copyright 2005-2007 Pandora Media, Inc., printed Oct. 26, 2007, 1 page.
"RYM FAQ—Rate Your Music," http://rateyourmusic.com/faq/, copyright 2000-2007 rateyourmusic.com, printed Nov. 8, 2007, 14 pages.
"Rhapsody—Full-length music, videos and more—FREE," http://www.rhapsody.com/welcome.html, copyright 2001-2007 Listen.com, printed Feb. 7, 2007, 1 page.
Badrul M. Sarwar et al., "Recommender Systems for Large-scale E-Commerce: Scalable Neighborhood Formation Using Clustering," 2002, 6 pages.
"Soundflavor," http://www.soundflavor.com/, copyright 2003-2007 Soundflavor, Inc., printed Feb. 7, 2007, 1 page.
"That canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.
"Trillian (software)—Wikipedia, the free encyclopedia," http://en.wikipedia.org/wiki/Trillian_(instant_messenger), printed Nov. 8, 2007, 11 pages.
"Goombah—Preview," http://www.goombah.com/preview.html, printed Jan. 8, 2008, 5 pages.
Jeff Mascia et al., "Lifetrak: Music In Tune With Your Life," copyright 2006, 11 pages.
"Ringo: Social Information Filtering for Music Recommendation," http://jolomo.net/ringo.html, printed Aug. 3, 2009, 1 page.
"Tour's Profile," http://mog.com/Tour, copyright 2006-2009 Mog Inc., printed Aug. 3, 2009, 11 pages.
"Babulous :: Keep it loud," http://www.babulous.com/home.jhtml, copyright 2009 Babulous, Inc., printed Mar. 26, 2009, 2 pages.
Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.
Cai, Rui et al., "Scalable Music Recommendation by Search," Proc. ACM Multimedia, Augsburg, Germany, Sep. 2007, pp. 1065-1074.
Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
Yahoo! Music downloaded archival page from www.archive.org for Jun. 20, 2005, copyright 2005 Yahoo! Inc., 14 pages.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
"Hulu—About," www.hulu.com/about/product_tour, copyright 2010 Hulu LLC, printed Jun. 15, 2010, 2 pages.
"Identifying iPod models," http://support.apple.com/kb/HT1353, printed Feb. 24, 2010, 13 pages.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.

Nilson, Martin, "id3v2.4.0-frames-ID3.org," http://www.id3.org/id3v2.4.0-frames, Nov. 1, 2000, copyright 1998-2009, printed Jun. 15, 2010, 31 pages.
"Songbird," http://getsongbird.com/, copyright 2010 Songbird, printed Jun. 15, 2010, 2 pages.
"SongReference," http://songreference.com/, copyright 2008, SongReference.com, printed Jun. 15, 2010, 1 page.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.
Cohen, William W., "Web-Collaborative Filtering: Recommending Music by Spidering the Web," Computer Networks: The International Journal of Computer and Telecommunications Networking, 33(1-6), pp. 685-698, Jun. 2000, 20 pages.
Kaji, Katsuhiko et al., "A Music Recommendation System Based on Annotations about Listeners' Preferences and Situations," Proceedings of the First International Conference on Automated Production of Cross Media Content for Multi-Channel Distribution (AXMEDIS'05), Nov. 30-Dec. 2, 2005, Florence, Italy, copyright 2005, IEEE, 4 pages.
"14 Exciting Finalists Announced in Popkomm—IMEA Awards," Netherlands Corporate News, Business Wire, Aug. 3, 2005, at <http://www.netherlandscorporatenews.com/archive/en/2005/09/14/f003.htm>, printed Apr. 1, 2011, 6 pages.
Abstract, Chinese Patent Publication No. 1841385A, published Oct. 4, 2006, "Method of supplying content data and playlist thereof," Chinese Patent Application No. 20061073372, filed Mar. 31, 2006, Applicant: Sony Corp, Inventor: Takeh Miyajima Yasushi Yamashi, obtained from http://www.espacenet.com, 1 page.
Abstract, Japanese Patent Publication No. 2002-196778, published Jul. 12, 2002, "Information Reproducing Apparatus with Reproduction Function Giving Priority to History," Japanese Patent Application No. 2000-392591, filed Dec. 25, 2000, Applicant: Kenwood Corp, Inventor: Negi Takeshi, obtained from Patent Abstracts of Japan, printed Nov. 29, 2011, 1 page.
Abstract, Japanese Patent Publication No. 2007-011452, published Jan. 18, 2007, "Program, Data Processing Method, Data Processor, Audio Reproducing Apparatus," Japanese Patent Application No. 2005-188058, filed Jun. 28, 2005, Applicant: Sony Corp, Inventor: Matsuda Koichi, obtained from Patent Abstracts of Japan, printed Nov. 29, 2011, 1 page.
Abstract, Japanese Patent Publication No. 2008-027042, published Feb. 7, 2008, "Automatic Blog Generation System, Automatic Blog Generation Method, and Program," Japanese Patent Application No. 2006-196882, filed Jul. 19, 2006, Applicant: NEC Corp, Inventor: Arimitsu Kazuhiro, obtained from Patent Abstracts of Japan, printed Nov. 29, 2011, 1 page.
Abstract, Korean Patent Publication No. 20020007934, published Jan. 29, 2002, "Electronic Album System for Wire/Wireless Internet Diary," Korean Patent Application No. 20000042073, filed Jul. 19, 2000, Applicant/Inventor: Park Jong Deuk, obtained from www.espacenet.com, printed Nov. 29, 2011, 1 page.
Abstract, Reddy, S. and Mascia, J., "Lifetrak: music in tune with your life," Proceedings of the 1st ACM International Workshop on Human-Centered Multimedia 2006 (HCM '06), Santa Barbara, California, pp. 25-34, ACM Press, New York, NY, 2006, found at <http://portal.acm.org/citation.cfm?id=1178745.1178754>, ACM Portal, printed Oct. 2, 2007, 3 pages.
"Apple—iTunes—What is iTunes?—A player, a store, and more," at <http://www.apple.com/itunes/whatis/>, printed Aug. 11, 2009, 2 pages.
"Crysanth Diary Writing," at <http://www.netimediary.com/diarysoftware/>, copyright Crysanth Software, printed Aug. 17, 2009, 3 pages.
Kirkpatrick, M., "Be an iTunes DJ with SpotDJ," TechCrunch, Oct. 16, 2006, at <http://techcrunch.com/2006/10/16/be-an-itunes-dj-with-spotdj/>, printed Apr. 8, 2011, 3 pages.
"LAUNCHcast Radio," Yahoo! Messenger, dated Jun. 12, 2004, at <http://messenger.yahoo.com/launch.php>, obtained from the Internet Archive, printed Apr. 6, 2011, 1 page.

(56) References Cited

OTHER PUBLICATIONS

"Lifeblob—Your Life on a Timeline!," at <http://www.lifeblob.com>, copyright 2009, Aetas Tech Pvt Ltd, printed Apr. 16, 2009, 1 page.
"Lifehaps," at <http://www.lifehaps.com/>, copyright 2008, Capital H Creative, printed Apr. 16, 2009, 1 page.
"LinkedIn: Relationships Matter," at <http://www.linkedin.com/>, copyright 2009, LinkedIn Corporation, printed Jan. 22, 2009, 1 page.
Mainelli, T., "New MP3 Player Ready to Rival IPod," PCWorld, Jan. 10, 2003, at <http://www.pcworld.com/article/108608/new_mp3_player_ready_to_rival_ipod.html>, printed Apr. 1, 2011, 3 pages.
Martin Rebas, "Music Diary," at <http://www.rebas.se/aboutme/musicdiary.shtml>, printed Aug. 17, 2009, 7 pages.
"MyStrands—Social Recommendation and Discovery," at <http://mystrands.com/>, on the Internet Archive, copyright 2003-2008, Strands, Inc., printed Aug. 17, 2009, 4 pages.
"MyStrands Labs: Patent-pending Technologies," at <http://labs.mystrands.com/patents.html>, printed Feb. 7, 2007, 5 pages.
Oates, J., "An MP3 player you can talk to . . . Muttering nutters with headphones," The Register, Jan. 19, 2005, at <http://www.theregister.co.uk/2005/01/19/ipod_listens/>, printed Apr. 1, 2011, 2 pages.
Pampalk, E. and Goto, M., "MusicSun: A New Approach to Artist Recommendation," In Proceedings of the 8th International Conference on Music Information Retrieval (ISMIR 2007), Vienna, Austria, Sep. 2007, copyright 2007, Austrian Computer Society (OCG), found at <http://citeseerx.ist.psu.edu/viewdoc/download?doi=10.1.1.69.1403&rep=rep1&type=pdf>, 4 pages.
"Rhapsody Unlimited," at <http://learn.rhapsody.com/plans/unlimited?src=rcom_acctcrt_uld&pcode=rn>, copyright 2001-2008, Listen.com, subsidiary of RealNetworks, printed Aug. 13, 2009, 1 page.
Samiljan, T., "Hype Check: Sansa Connect," Switched, Apr. 23, 2007, at <http://www.switched.com/2007/04/23/hype-check-sansa-connect/>, printed Apr. 1, 2011, 3 pages.
"Share Audio Files Zune to Zune," dated Dec. 8, 2006, at <http://www.zune.net/en-us/support/howto/zunetozune/sharesongs.htm>, copyright 2006, Microsoft Corporation, obtained from the Internet Archive, printed Apr. 6, 2011, 2 pages.
"UltraTech-Software.com—High Quality Software @ Affordable Prices. Why pay more?," at <http://www.ultratech-software.com/ultradiary.html>, copyright 2006, UltraTech-Software.com, printed Apr. 16, 2009, 2 pages.
Wang, J. and Reinders, M.J.T., "Music Recommender system for Wi-Fi Walkman," No. ICT-2003-01 in the ICT Group Technical Report Series, Information & Communication Theory Group, Department of Mediamatics, Faculty of Electrial Engineering, Mathematics and Computer Science, Delft University of Technology, Delft, The Netherlands, 2003, 23 pages.
Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8, 2005, found at <http://citeseerx.ist.psu.edu/viewdoc/download-?doi=10.1.1.108.3459&rep=rep1&type=pdf>, 10 pages.
"WQLJ," at <http://209.41.184.28/radio_tool.cfm?pnpid=5 . . . >, on the Internet Archive, printed Aug. 17, 2009, 1 page.
"BuddyList: list your social network," at <http://drupal.org/handbook/modules/buddylist>, available on Internet Archive as early as Jan. 2006, printed Jul. 12, 2007, 1 page.
"Ezmo Blog," earliest entry on Jun. 8, 2007, found at <http://www.blogger.com/feeds/4973602063656473330/posts/default>, printed Jul. 12, 2007, 18 pages.
Freeman, Anne, "Find Out About: GorillaPop Artist/Fan Community," Jul. 4, 2005, MusicDish Industry e-Journal, at <http://www.musicdish.com/mag/indexphp3?id=10305>, copyright 1997-2007, MusicDish L.L.C., printed Jul. 12, 2007, 7 pages.
"OpenID and Social Networking," Dec. 3, 2006, at <http://www.apparently.me.uk/623.html>, printed Jul. 12, 2007, 2 pages.
"Social Networking and Music: MySpace Puts it All Together in a Virtual Community," by Scott G., submitted on Mar. 3, 2005, found at <http://ezinearticles.com/?Social-Networking-and-Music:-MySpace-Puts-It-All-Together-in . . . >, printed Jul. 12, 2007, 4 pages.

\* cited by examiner

| USER DATABASE 18 |||
|---|---|---|
| FRIENDS LIST 28 |||
| RECOMMENDER IDENTIFIER 32 | RECOMMENDER TAGS 34 ||
| USER "B" | 1980's ||
| USER "C" | 1990's, 2000's, not country ||
| USER "D" | work ||
| USER "E" | rock ||
| USER "F" | work, card player ||
| USER "G" | 1970's, Artist "A" ||
| USER "N" | church, 1960's, country ||
| PRESENTATION CHANNEL LIST 30 |||
| PRESENTATION CHANNEL NAME 36 | PRESENTATION CHANNEL CRITERIA 38 | STATUS 40 |
| The Grind | social = work | |
| The Me Decade | decade = 1980's | ACTIVE |
| Geezer Music | decade = 1960's | |
| Wild and Crazy | genre = rock | ACTIVE |
| New Non-Country | decade = 1990's or decade = 2000's and genre ≠ country | |

*FIG. 3*

| FRIENDS 138 | DECADE 140 | GENRE 142 | ARTIST 144 | SOCIAL 146 | OTHER 148 | ADD 150 | REPLACE 152 |
|---|---|---|---|---|---|---|---|
| | | | FRIENDS TAGS "JAY" 136 | | | SAVE / CANCEL 154 / 156 | CLOSE 158 |
| HUGH | <none> | <none> | <none> | <none> | <none> | ADD | REPLACE |
| MICHAEL | 1980's | <none> | not Artist "A" | <none> | <none> | ADD | REPLACE |
| SEAN | 1960's | rock | <none> | <none> | <none> | ADD | REPLACE |
| MIKE | 1970's | rock | <none> | work | <none> | ADD | REPLACE |
| WAYMEN | <none> | <none> | <none> | <none> | <none> | ADD | REPLACE |
| GENE | 1980's | <none> | <none> | <none> | <none> | ADD | REPLACE |
| GARY | 1960's, 1970's | not country | <none> | <none> | <none> | ADD | REPLACE |

*FIG. 16*

SYSTEM AND METHOD OF FILTERING RECOMMENDERS IN A MEDIA ITEM RECOMMENDATION SYSTEM

FIELD OF THE INVENTION

The present invention relates to a system and method of filtering recommenders in a media item recommendation system. The present invention facilitates a recipient user controlling from which recommenders media item recommendations can be received at any given time based on one or more attributes associated with the recommenders.

BACKGROUND OF THE INVENTION

In recent years, there has been an enormous increase in the amount of digital media available online. Some services, such as Apple's iTunes® for example, enable users to legally purchase and download music. Other services, such as Yahoo!® Music Unlimited and RealNetwork's Rhapsody®, provide access to millions of songs for a monthly subscription fee, and YouTube® provides users access to video media. As a result, media items have become much more accessible to consumers worldwide. Due to the large amount of accessible digital media, recommendation technologies are emerging as an important enabler to assist users in identifying and navigating large databases of available media. Recommendations are useful to help users identify and select media items of interest for usage and/or play.

Recommendations may be programmatically-generated by a company based on the user's predefined preferences and/or profile. Recommendations may also be provided by other users. Particularly, the users may be peers on a social network. The social network provides for the exchange of media item recommendations among the users, such as the result of a recommender playing a media item, for example. As such, the user in the media item recommendation system may be both a recommender of media items to other users and a recipient of media item recommendations from other users. In this manner, the user may receive a media item recommendation from another user and transmit a media item recommendation to other users.

Current recommendation technologies allow the recipient to select the other users in the media item recommendation system from whom the recipient desires to receive recommendations. The recipient may do this by establishing one or more friends lists. In this manner, if a recommender is listed in one of the recipient's friends lists, recommendations from that recommender will be sent to the recipient. If a recommender is not listed in the recipient's friends lists, recommendations from that recommender will not be sent to the recipient. However, even if a recommender is listed in one of the recipient's friends lists, the recipient may be sent recommendations that may not be desirable or interesting. Also, a particular recommender may not be suitable, in the recipient's perspective, to make a certain type of recommendation. For example, a particular recommender may not be known as a connoisseur of a certain music genre. Accordingly, the recipient may not highly value song recommendations in that music genre from that recommender and, therefore, may not be interested in being sent such recommendations from that recommender.

A recourse for the recipient to stop certain types of recommendations being sent from an unsuitable recommender is to delete the recommender from the friends lists. However, the deleted recommender may be suitable for making another type of recommendation, such as for songs in a different music genre for example. Because that recommender was deleted from the recipient's friends list, the recipient will receive no recommendations from that recommender, even for the types of recommendations for which the recipient may consider that recommender suitable.

Accordingly, there is a need for a system and method that allows the recipient to control and customize the types of recommendations the recipient may be sent from different recommenders based on the recipient's perspective and at any given time.

SUMMARY OF THE INVENTION

The present invention is directed to a system and method of allowing a recipient to control and customize the types of recommendations the recipient may be sent from different recommenders by filtering the recommenders. The recommenders may be filtered using a tag associated with the recommenders. A tag may be any attribute. The attribute may relate to or describe a social relationship and/or a media item attribute. Examples of social attributes may be work, school, church, or sports. Examples of media item attributes may be genre, decade of release, and/or artist. In one embodiment of the present invention, the recommenders may be filtered using a current selection criterion established by the recipient. If a tag associated with the recommender matches the current selection criterion, media item recommendations from the recommender may be sent to the recipient. On the other hand, if a tag associated with the recommender does not match the current selection criterion, the media item recommendations from the recommender may not be sent to the recipient. In this manner, the recipient may tag recommenders to control whether media item recommendations from certain recommenders should be sent to the recipient.

In another embodiment of the present invention, the recipient may set the current selection criterion for filtering recommenders by defining a presentation channel. The recipient activates filtering by setting the presentation channel to the desired selection criterion. If a recommender tag matches the selection criterion of an active presentation channel and the type of media item recommendation from the recommender matches the selection criterion of the active presentation channel, the media item recommendation may be sent to the recipient. If the recommender tag does not match the selection criterion of the active presentation channel, the recommender may be filtered out. In such case, media item recommendations from the filtered out recommender may not be sent to the recipient. In this manner, the recipient may select from which recommenders media item recommendations can be sent to the recipient.

By filtering recommenders, the recipient may control and customize the recommenders and the types of media item recommendations from those recommenders that are sent to the recipient. Additionally, the controlling and customizing by the recipient may be based on the recipient's perspective at any given time by activating different presentation channels to select the desired selection criteria. For example, if the presentation channel is selected as the "work" criterion, the recipient will be sent recommendations only from recommenders tagged with "work." As another example, if the presentation channel is selected as the "rock" music genre criterion, the recipient will be sent media item recommendations only from those recommenders tagged with "rock" music genre. This allows the recipient to discriminate as to which recommender may be better suited or desired to make media item recommendations based on the selection criterion by activating the desired presentation channel.

A recommender may be tagged with multiple attributes. If the selected presentation channel requires that multiple criteria be met, media item recommendations may only be sent to the recipient from a recommender if the recommender is tagged with all of the criteria selected for the active presentation channel.

In another embodiment of the present invention, conflicts between recommender tags and/or conflicts between criteria selected for the presentation channel may be identified so that filtering may be performed as intended. One type of conflict is a logical conflict. A logical conflict exists if recommender tags, or multiple criteria selected for the presentation channel, are logically mutually exclusive. For example, the recipient may have tagged a recommender with "rock" music genre and "not rock" music genre. Accordingly, these recommender tags are in logical conflict. If the recommender tags and/or the presentation channel criteria logically conflict, an alert may be generated and presented to the recipient.

In another embodiment of the present invention, operational conflicts may be detected. An operational conflict may be present if the recipient has not been sent any media item recommendations from a particular tagged recommender. This may be an indication that the recommender has not been effectively tagged. In the event of an operational conflict, a prompt may be generated and presented to the recipient. This prompt may be conditioned on a period of time elapsing since the recommender was tagged, a period of time elapsing since a particular presentation channel was activated, and/or after a certain number of media item recommendations were sent from other similarly tagged recommenders. In response to the prompt, the recipient may elect to take some type of action including, but not limited to, tagging the recommender with a different attribute(s).

In another embodiment of the present invention, a prompt may be generated and presented to the recipient when a new untagged recommender is added to one of the recipient's friends lists. An untagged recommender may be filtered out, and thus, media item recommendations from the recommender may not be sent to the recipient. The prompt may be generated as a result of the new recommender sending a media item recommendation intended for the recipient which matches the active presentation channel. In response, the recipient may then tag the new recommender. In this manner the new recommender's media item recommendations may be sent to the recipient when the recipient activates a presentation channel that matches the new recommender's tag.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 3 is a block diagram of an exemplary user database illustrating the storing and/or recording of recommender identifiers and associated tags, and presentation channel names and criteria defining the presentation channels, according to an embodiment of the present invention;

FIG. 16 is an exemplary friends' recommender tags GUI illustrating recommender tags that other users have given to a recommender, according to an embodiment of the present invention;

DETAILED DESCRIPTION OF THE PREFERRED EMBODIMENTS

Figure 1:
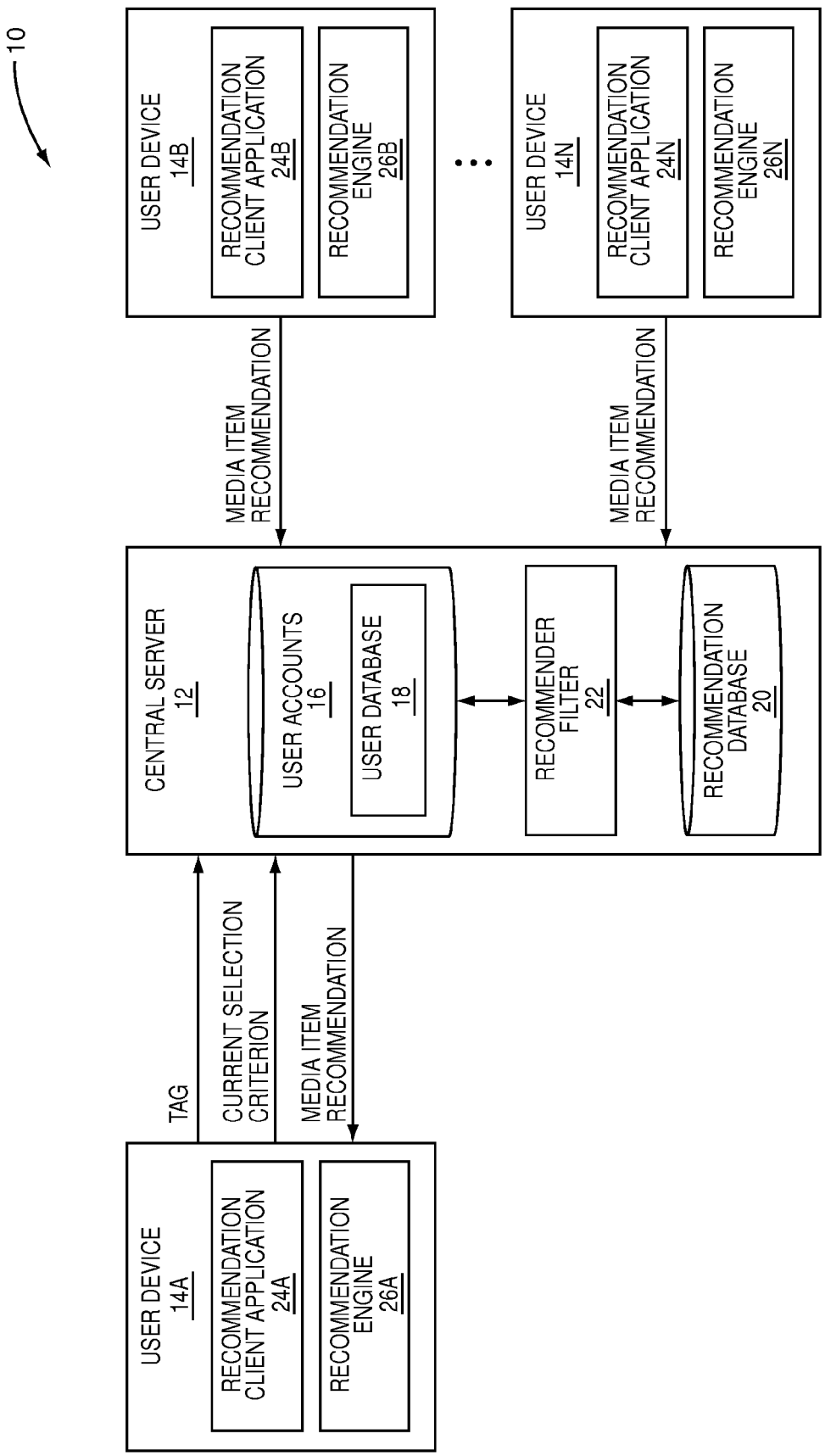
FIG. 1 is a schematic diagram illustrating an exemplary media item recommendation system, which allows a recipient to filter recommenders, according to an embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is directed to a system and method of allowing a recipient to control and customize the types of recommendations the recipient may be sent from different recommenders by filtering the recommenders. The recommenders may be filtered using a tag associated with the recommenders. A tag may be any attribute. The attribute may relate to or describe a social relationship and/or a media item attribute. Examples of social attributes may be work, school, church, or sports. Examples of media item attributes may be genre, decade of release, and/or artist. In one embodiment of the present invention, the recommenders may be filtered using a current selection criterion established by the recipient. If a tag associated with the recommender matches the current selection criterion, media item recommendations from the recommender may be sent to the recipient. On the other hand, if a tag associated with the recommender does not match the current selection criterion, the media item recommendations from the recommender may not be sent to the recipient. In this manner, the recipient may tag recommenders to control whether media item recommendations from certain recommenders should be sent to the recipient.

In another embodiment of the present invention, the recipient may set the current selection criterion for filtering recommenders by defining a presentation channel. The recipient activates filtering by setting the presentation channel to the desired selection criterion. If a recommender tag matches the selection criterion of an active presentation channel and the type of media item recommendation from the recommender matches the selection criterion of the active presentation channel, the media item recommendation may be sent to the recipient. If the recommender tag does not match the selection criterion of the active presentation channel tag, the recommender may be filtered out. In such case, media item recommendations from the filtered out recommender may not be sent to the recipient. In this manner, the recipient may select from which recommenders media item recommendations can be sent to the recipient.

By filtering recommenders, the recipient may control and customize the recommenders and the types of media item recommendations from those recommenders are sent to the recipient. Additionally, the controlling and customizing by the recipient may be based on the recipient's perspective at any given time by activating different presentation channels to select the desired selection criteria. For example, if the presentation channel is selected as the "work" criterion, the recipient will be sent media recommendations only from recommenders tagged with "work." As another example, if the presentation channel is selected as the "rock" music genre criterion, the recipient will be sent media item recommendations only from those recommenders tagged with "rock" music genre. This allows the recipient to discriminate as to which recommender may be better suited or desired to make media item recommendations based on the selection criterion by activating the desired presentation channel.

A recommender may also be tagged with multiple attributes. If the selected presentation channel requires that multiple criteria be met, media item recommendations may only be sent to the recipient from a recommender if the recommender is tagged with all of the criteria selected for the active presentation channel.

In another embodiment of the present invention, conflicts between recommender tags and/or conflicts between the criteria selected for the presentation channel may be identified so that filtering may be performed as intended. One type of conflict is a logical conflict. A logical conflict exists if recommender tags, or multiple criteria selected for the presentation channel, are logically mutually exclusive. For example, the recipient may have tagged a recommender with "rock" music genre and "not rock" music genre. Accordingly, these recommender tags logically conflict. If the recommender tags and/or the presentation channel criteria logically conflict, an alert may be generated and presented to the recipient.

In another embodiment of the present invention, operational conflicts may be detected. An operational conflict may be present if the recipient has not been sent any media item recommendations from a particular tagged recommender. This may be an indication that the recommender has not been effectively tagged. In the event of an operational conflict, a prompt may be generated and presented to the recipient. This prompt may be conditioned on a period of time elapsing since the recommender was tagged, a period of time elapsing since a particular presentation was activated, and/or after a certain number of media item recommendations were sent from other similarly tagged recommenders. In response to the prompt, the recipient may elect to take some type of action including, but not limited to, tagging the recommender with a different attribute(s).

In another embodiment of the present invention, a prompt may be generated and presented to the recipient when a new untagged recommender is added to one of the recipient's friends lists. An untagged recommender may be filtered out, and thus, media recommendations from the recommender may not be sent to the recipient. The prompt may be generated as a result of the new recommender sending a media item recommendation intended for the recipient which matches the active presentation channel. In response, the recipient may then tag the new recommender. In this manner, the new recommender's media item recommendations may be sent to the recipient when the recipient activates a presentation channel that matches the new recommender's tag.

Although the terms "recipient" and "recommender" are used herein, it should be understood that a user in the media item recommendation system may be both a recipient and a recommender. For purposes of discussing embodiments of the present invention herein, when describing a user that is transmitting a media item recommendation, the term "recommender" may be used, and when describing a user that is receiving a media item recommendation, the term "recipient" may be used. If the term "user" is used, it shall be understood to refer to either and/or both recommender or recipient, except as may otherwise be specifically indicated by the context. Additionally, when the terms "transmit" and "send," and variations thereof, are used herein, it should be understood that those terms refer to the same action and, therefore, have the same meaning.

Figure 2:
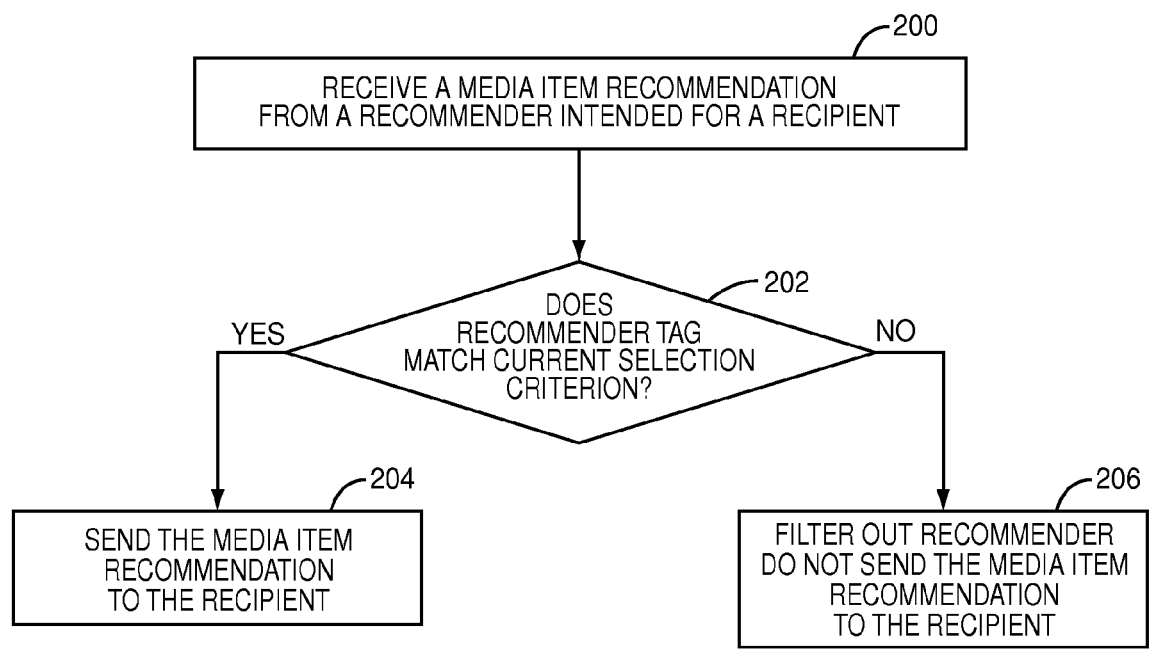
FIG. 2 is a flow chart illustrating a process for filtering recommenders in a media item recommendation system, according to an embodiment of the present invention.

Before discussing the filtering of recommenders and their recommendations in accordance with various embodiments of the present invention, an exemplary media item recommendation system is first discussed. FIG. 1 illustrates such an exemplary media item recommendation system 10 that may be employed by the present invention. FIG. 2 begins the discussion of the process for filtering recommenders.

The media item recommendation system 10 allows a recipient to control and customize the types of media item recommendations the recipient may be sent from different recommenders by filtering the recommenders using tags associated with the recommenders. The media item recommendation system 10 has a central server 12 that provides media-based services and manages the flow of information and services provided to the users of the media item recommendation system 10. The users in the media item recommendation system 10 may interact with the central server 12 via user devices 14. The central server 12 may communicate with other devices and systems, including the user devices 14, over a network (not shown). Similarly, the user devices 14 may be able to communicate with other devices and systems over the network. The network may be any private network or distributed public network such as, but not limited to, the Internet.

To provide media-based services and effectively manage the flow of information and services to the user devices 14, the central server 12 may comprise a database of user accounts 16, a recommendation database 20, and a recommender filter 22. User accounts 16 may be established for each user in the media item recommendation system 10. Accordingly, to access and receive the services of the central server 12, a user using the user device 14 establishes a user account 16 with the central server 12. The user accounts 16 may contain a user database 18 used to store tags for recommenders and criteria that can be selected for filtering the recommenders.

Once the user establishes a user account 16, the user using the user device 14 may receive and download a recommendation client application 24, which provides a customized software interface to the central server 12. After the recommendation client application 24 is downloaded onto the user device 14, the recommendation client application 24 executes on the user device 14, and the user of the user device 14 may interact with and receive the services and information provided by and through the central server 12 and perform functions associated with the media item recommendation system 10. Such functions may involve the user as a recommender and/or a recipient of media item recommendations.

Accordingly, the user as a recommender may send media item recommendations intended for a recipient via the central server 12. In this case, the recommender may cause a media item recommendation to be generated using a recommendation engine 26 resident on the user device 14. The recommendation engine 26 may be any program, algorithm, or control mechanism that handles the generation and/or sending of media item recommendations. The recommendation engine 26 may generate a media item recommendation by the user device 14 playing a media item and/or some other action of the user device 14. Additionally, the media item recommendation may be identified as either implicit or explicit. The media item recommendation may be identified as implicit if the media item recommendation resulted from the user device 14 playing the media item, or some other action, other than the user of the user device 14 deciding to explicitly direct the recommendation engine 26 to generate and send the media item recommendation. However, if the user explicitly directed the recommendation engine 26 to send the media item recommendation to the recipient without, or at least not at the same time as, playing the media item, the media item recommendation may be identified as explicit.

Additionally, the user as a recipient may control whether the central server 12 sends the media item recommendation received from the recommender to the recipient. The recipient may tag recommenders and establish a current selection criterion such that the recommender tags are compared with the current selection criterion to control and customize which recommender's media item recommendations may be sent to the recipient. The tag and/or the current selection criterion is sent or communicated from the user device 14 to the central server 12. The central server 12 may receive the tag and the current selection criterion and record and/or store them in the user database 18. Alternatively, the central server 12 may record and/or store the tag and the current selection criterion in separate databases and/or storage facilities internal and/or external to the central server 12.

The tag may be in the form of a metadata tag. The recipient may associate the tag with one of the other users in the media item recommendation system 10. In such a case, the other user in the media item recommendation system 10 may be a recommender of media items to the recipient. The central server 12 may store and/or record the name and/or some other unique identifier of the recommender and the recommender tag in the user database 18. In this manner, the user database 18 may list one or more recommenders and the recommender tags associated with the listed recommenders.

The central server 12 may receive media item recommendations sent by the user device 14. Upon receipt of the media item recommendation, the central server 12 may store and/or record the media item recommendations in the recommendation database 20. Various types of information included in the media item recommendation received by the central server 12 may be stored and/or recorded in the recommendation database 20. Such information may include, but is not limited to, whether the media item recommendation is implicit or explicit, the identity of the recommender, the title and attributes of the recommended media item, and the identity of the author, as examples. The attributes of the recommended media item may relate to genre, date or decade of release of the media item, and/or artist, for example. Additionally, the information may also include, and the recommendation database 20 may store and/or record, a score for the recommended media item. The score may be any type of rating or basis that may reflect the popularity of the media item and may be based on the number of times the users in the media item recommendation system 10 play and/or recommend the media item.

The central server 12 may determine whether to send a media item recommendation to the recipient based on the identity of the recommender, the recommender tag, and the current selection criterion. The central server 12 may use the recommender filter 22 to perform this function. In this manner, the recommender filter 22 may search the user database 18 to determine whether the recommender of the media item recommendation is listed in the user database 18. If the recommender is listed in the user database 18, the recommender filter 22 may determine whether the recommender has a recommender tag. The recommender filter 22 may then compare the recommender tag with the current selection criterion. If the recommender tag matches the current selection criterion, the media item recommendation from the recommender may be sent to the recipient. Alternatively and/or additionally, the recipient may elect to not have the central server 12 filter explicit media item recommendations of the recommender using the recommender filter 22. In such a case, the central server 12 may send the explicit media item recommendation of the recommender directly to the recipient.

Although three peer user devices 14A, 14B, 14N are shown, it should be understood that this embodiment of the present invention is not limited to any number of user devices 14. Additionally, for purposes of discussing this embodiment of the present invention, the user device 14A may be referred to when discussing a recipient's user device 14 while the user device 14B and/or the user device 14N may be referred to when discussing a recommender's user device 14. It should be understood that each user device 14A, 14B, 14N may be used as the recipient's and/or the recommender's user device 14, and the present invention does not distinguish between any particular user device 14.

In this embodiment, the central server 12 operates in a client-server relationship with the user devices 14. However, it should be noted that the present invention may be implemented in a peer-to-peer configuration where features of the central server 12 are provided by a "super" peer user device 14. The central server 12, in whatever form provided, provides media-based services to the user devices 14. Note that the central server 12 also may be implemented as a number of servers operating in a collaborative fashion. An example of a media item recommendation system that may be implemented in a user-server or peer-to-peer configuration is described in co-pending U.S. patent application Ser. No. 11/484,130, entitled "P2P NETWORK FOR PROVIDING REAL TIME MEDIA RECOMMENDATIONS," filed Jul. 11, 2006, which is incorporated herein by reference in its entirety.

FIG. 2 is a flow chart illustrating a process for filtering recommenders in a media item recommendation system 10 according to one embodiment of the present invention. FIG. 2 is provided to further illustrate the manner in which the recipient may customize and control the recommenders and the media item recommendations that may be sent to the recipient from recommenders.

As illustrated in FIG. 2, the process starts by receiving a media item recommendation for a media item from a recommender intended for a recipient (step 200). Before the recommendation is sent to the recipient, it is first determined if the recommender has a recommender tag that either allows or precludes the recommendation from being sent to the recipient. The process proceeds with determining whether the recommender tag matches the current selection criterion established by the recipient (step 202). If the recommender tag matches the current selection criterion, the media item recommendation may be sent to the recipient (step 204). If the recommender tag does not match the current selection criterion, the recommender may be filtered out and the media item recommendation may not be sent to the recipient (step 206). In this manner, the recipient may be allowed to control and customize the types of recommendations the recipient may be sent from different recommenders by filtering the recommenders using the current selection criterion established by the recipient.

In order to perform the filtering step of determining whether the recommender tag matches the current selection criterion, the recommender filter 22 in the media item recommendation system 10 may be employed. The recommender filter 22 may search the user database 18 for the recommender, the recommender tag, and the current selection criterion. The recommender filter 22 may then compare the recommender tag with the current selection criterion to determine whether the recommender tag matches the current selection criterion. If the recommender tag matches the current selection criterion, and the media item being recommended matches the current selection criterion, the media item recommendation from that recommender may be sent to the recipient. If the recommender tag does not match the current selection criterion, or the media item being recommended does not match the current selection criterion, the recommender may be filtered out and the media item recommendation from that recommender may not be sent to the recipient.

To facilitate establishing the current selection criterion, the recipient may use established selection criterion to define a presentation channel. The recipient may then select which criterion to use as a filter by activating the desired presentation channel. In other words, the recipient may establish the current selection criterion, thereby selecting which filter to apply at any given time, by activating the presentation channel defined by the desired selection criterion.

The recipient may also name or otherwise identify the presentation channel such that the name of the presentation channel describes and/or is logically associated with the criterion defining the presentation channel. The name of the presentation channel and the criterion defining the presentation channel may be recorded and/or stored in the user database 18. Thus, activating the presentation channel may be performed by selecting the name of the presentation channel.

FIG. 3 is a block diagram of an exemplary user database 18 that may be searched by the recommender filter 22 for filtering recommenders according to embodiments of the present invention. The user database 18 facilitates the storing and/or recording of the recommender identifiers, the recommender tags, the presentation channel names, and the criteria defining the presentation channels, according to one embodiment of the present invention. FIG. 3 is provided to show the relationship between the different recommender names and/or identifiers and recommender tags, and the presentation channel names and the criteria defining the presentation channels. For purposes of discussing the present invention, the term "name(s)" shall be understood to mean any type of identifier unless otherwise noted.

The user database 18 may comprise a friends list 28 and a presentation channel list 30. The friends list 28 may include a recommender identifier field 32 which may list the names and/or other unique identifiers for the recommenders in the friends list 28, and a recommender tags field 34, which lists the recommender tags for the recommenders listed in the friends list 28. The presentation channel list 30 may include a presentation channel name field 36 listing the names of the presentation channels. A presentation channel criteria field 38 may be included listing the criteria that the recipient uses to define the presentation channels. Further, a status field 40 may be included to indicate whether the presentation channel is active. The recommender filter 22 may determine whether criterion for an activated presentation channel matches a recommender tag, as indicated by the status field 40.

As shown in FIG. 3, the recommender tag listed in the recommender tags field 34 may be an attribute describing a social relationship between the recipient and the recommender. For example, a social attribute may be "work." The recommender tag listed in the recommender tag field 34 may also be a media item attribute, for example "rock" music genre. The following are examples of the recommender tags, the presentation channel criteria, and the manner in which they may be organized in the user database 18.

For example, the recipient may tag a recommender with a single attribute. As an example, User "B" is tagged with the attribute "1980's". As such, User "B" may be associated with songs released in the 1980's. In another example, User "D" is tagged with the attribute "work." User "D" may be associated with the recipient's work social context. Accordingly, User "D" may be a co-worker of the recipient.

Additionally, the recipient may tag the recommender with multiple attributes. For example, User "C" is tagged with the attributes "1990's," "2000's," and "not country." As such, User "C" may be associated with songs released in the 1990's, songs released in the 2000's, and songs that are not in the country genre. Also, as another example, User "F" is tagged with the attributes "work" and "card player." Accordingly, User "F" may not only work with the recipient but may also play cards with the recipient. In this manner, the recipient may use attributes describing the media items and/or social relationship settings to filter recommenders.

In the presentation channel list 30, the criteria defining the presentation channels are listed in the presentation channel criteria field 38. The presentation channel criteria field 38 may list a single criterion or multiple criteria. Additionally, multiple presentation channel criteria may be related by one or more Boolean operators. As with the recommender tags, the presentation channel criteria may describe a social relationship between the recipient and the recommender and/or the media item. Accordingly, the attributes used as recommender tags may be used as the criterion or criteria to define the presentation channels. In this manner, selection of a presentation channel determines which criterion is compared to the recommender tags to determine if a recommender will be filtered out or not.

The presentation channel names listed in the presentation channel name field 36 may associate with the criterion or criteria listed in the presentation channel criteria field 38. Therefore, the recipient may activate a particular presentation channel, and thereby establish a current selection criterion, by selecting the name of the presentation channel in the presentation channel name field 36. For example, the recipient may activate the presentation channel defined by the criterion "work" by selecting "The Grind." The recommender filter 22 may then compare the criterion "work" with the identity of the recommender of the media item recommendation by searching the friends list 28 to determine if the recommender has the recommender tag "work." Referring to the friends list 28, User "D" has a recommender tag that matches the criterion defining "The Grind" presentation channel. Accordingly, media item recommendations from User "D" may be sent to the recipient when "The Grind" presentation channel is active.

As another example, the recipient may activate the presentation channel defined by the criteria "decade=1990's" or "decade=2000's" and "genre≠country" by selecting "New Non-Country." The recommender filter 22 may then compare the criteria "decade=1990's" or "decade=2000's" and "genre≠country" with the identity of the recommender of the media item recommendation by searching the friends list 28 to determine if the recommender has the recommender tags of either "1990's" or "2000's" and "not country." Referring to the friends list 28 shows that the User "C" has the recommender tags "1990's," "2000's," and "not country." Accordingly, media item recommendations from User "C" may be sent to the recipient when the "New Non-Country" presentation channel is selected or active.

As discussed above, a recommender may be tagged with multiple recommender tags. Similarly, the presentation channel may be defined by multiple criteria. The following are three examples describing different situations involving multiple recommender tags and/or multiple criteria defining the presentation channel. The first example involves a presentation channel defined by a single criterion and a recommender having two recommender tags. The second example is the reverse, a presentation channel defined by two criteria and a recommender having a single recommender tag. The third example involves a presentation channel defined by two criteria and a recommender tagged with two recommender tags.

For the first example, the presentation channel may be defined by the criterion "genre=rock." The recommender may be tagged with "rock" and "1980's." The media item recommendations may be allowed even though there is not a one-for-one matching of the criterion defining the presentation channel and the two recommender tags. This is so because one of the recommender tags matches the single criterion defining the active presentation channel. However, in this first example, the media item being recommended may still have to match the presentation channel. In other words, the media item being recommended may still have to be a rock song.

For the second example, the presentation channel may be defined by the criteria "genre=rock" and "decade=1980's." The recommender may be tagged with a single recommender tag of "rock." The media item recommendations may not be allowed. This is because the criteria defining the presentation channel includes the Boolean operator "and," meaning that both criteria may have to be matched by the recommender tags. Since the recommender is tagged with a single recommender tag, the recommender tag does not match both criteria defining the presentation channel.

For the third example, the presentation channel may be defined by the criteria "genre=rock" and "decade=1980's." If the recommender is tagged with "rock" and "1980's," the recommender tags would match both of the criteria defining the active presentation channel. Thus, media item recommendations from the recommender may be sent to the recipient. As with the first example above, the media item being recommended may still have to match the presentation channel. In other words, the media item being recommended may have to be a rock song from the 1980's.

The status field 40 indicates which presentation channel is active. Additionally, the recipient may activate more than one presentation channel at a time. For example, the status field 40 indicates that the "The Me Decade" ("decade=1980's") presentation channel and "Wild and Crazy" ("genre=rock") presentation channels are active. Referring to the friends list 28, the recipient via "The Me Decade" presentation channel may be sent media item recommendations from User "B," as User "B" is tagged with the "1980's" recommender tag. Also, the recipient via the "Wild and Crazy" presentation channel may be sent media item recommendations from User "E," as User "E" is tagged with the "rock" recommender tag.

Figure 4A:
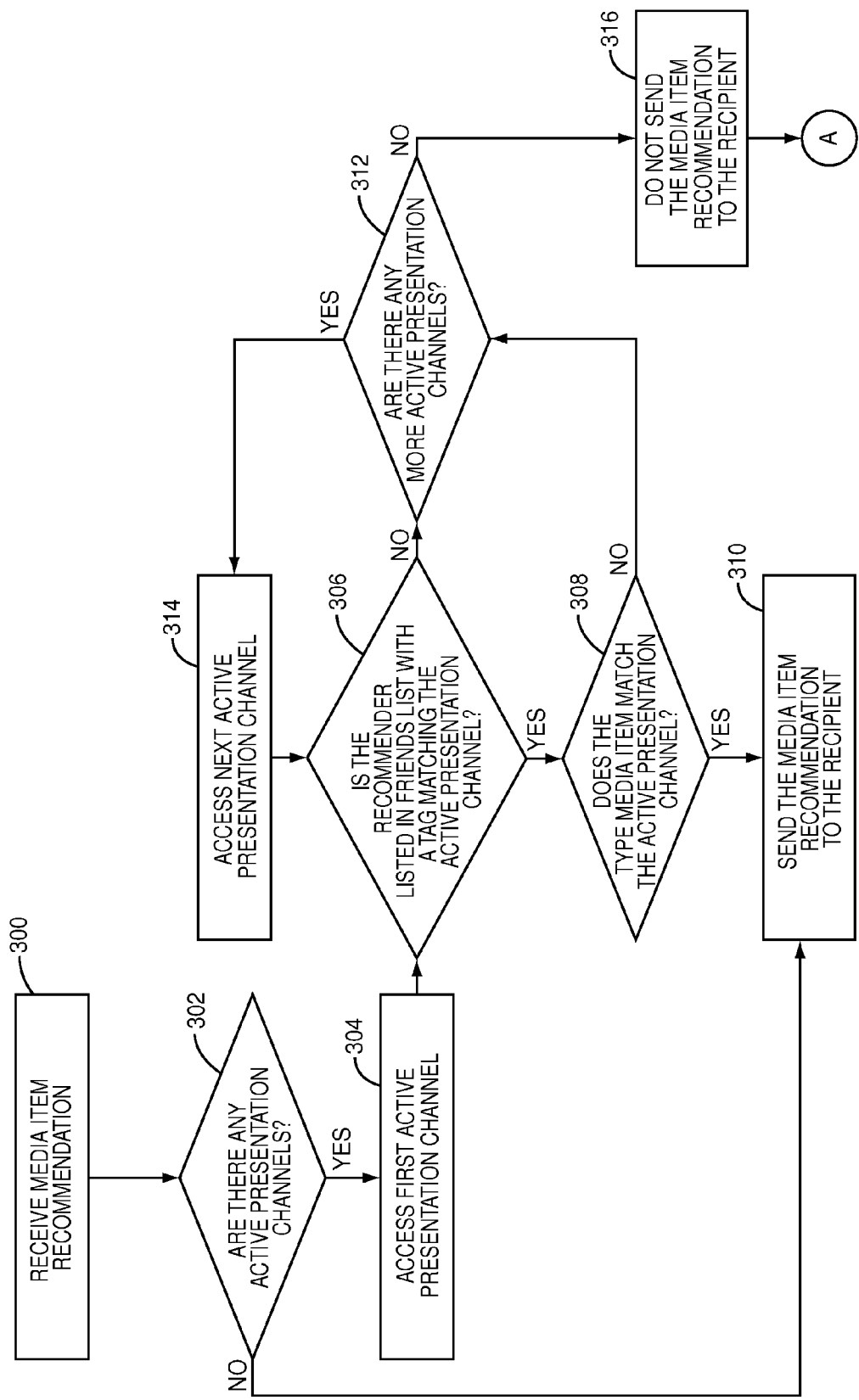
FIGS. 4A and 4B are flow charts illustrating the process for filtering recommenders using tags and a selected presentation channel, according to an embodiment of the present invention.
Figure 4B:
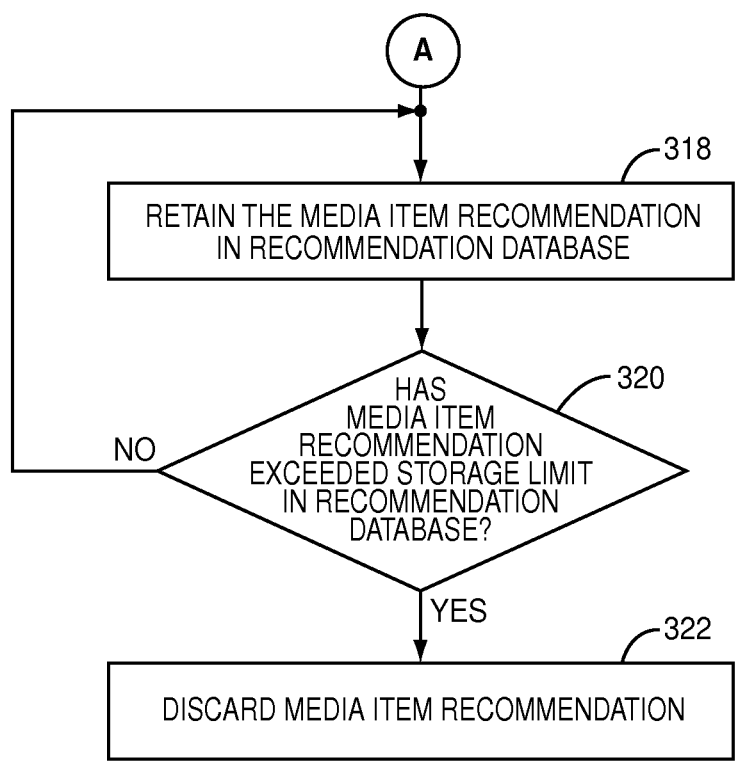

FIGS. 4A and 4B are flow charts provided to illustrate more detail about a recommender filtering process that may be employed according to an embodiment of the present invention. More specifically, FIGS. 4A and 4B illustrate the manner in which the recommender tag or tags may be used for filtering recommenders. The recommender tag(s) is compared with criterion or criteria of the selected presentation channel. If matching, media item recommendations made by the recommender may be sent to the recipient.

As illustrated in FIG. 4A, the process begins by receiving a media item recommendation (step 300). Upon receipt of the media item recommendation, a determination may be made as to whether there are any active presentation channels (step 302). If there are active presentation channels, the first active presentation channel listed may be accessed (step 304). Accessing the first active presentation channel may be performed by the recommender filter 22 searching the presentation channel list 30 in the user database 18. Once the first active presentation channel is accessed, the recommender filter 22 may search the friends list 28 in the user database 18 to determine whether the recommender is listed in the friends list 28, and if the recommender tag or tags match the criterion or criteria of the first active presentation channel (step 306).

If the recommender tag or tags match the criterion or criteria of the first active presentation channel, a further determination may be made as to whether the type of the media item being recommended also matches the presentation channel (step 308). If the type of media item being recommended also matches the presentation channel, the media item recommendation may be sent to the recipient (step 310). Referring again to step 302, if there are no active presentation channels, the media item recommendation may be sent to the recipient as a default step (step 310). In this manner, the recommendation client application 24 may assume that if the recipient has not activated any presentation channels, the recipient may be disregarding the recommender filtering process. Accordingly, the recipient may desire to receive media item recommendations without the recommenders being filtered.

If the recommender tag or tags do not match the first active presentation channel (step 306), a determination may be made as to whether there are any other active presentation channels (step 312). Similarly, if it is determined that the type of the media item being recommended does not match the active presentation channels (step 308), a determination may be made as to whether there are any other active presentation channels (step 312). If there is another active presentation channel (step 312), the next active presentation channel may be accessed (step 314) and the process loops back to and repeats from step 306. In this manner, the process may repeat for all active presentation channels. If there is not another active presentation channel (step 312), the media item recommendation may not be sent to the recipient (step 316).

If the media item recommendation is not sent to the recipient, the media item recommendation may be retained in the recommendation database 20 (step 318). A determination may then be made whether the media item recommendation exceeds a storage limit in the recommendation database 20 (step 320). The storage limit may be based on any condition such as, for example, the number of media item recommendations stored and/or recorded in the recommendation database 20, and/or the time that has expired since the media item recommendation may have been received. If the storage limit has not been exceeded, the process loops back to step 318 and step 320 to continuously check to determine if the storage limit has been exceeded. If the storage limit has been exceeded, the media item recommendation is discarded (step 322).

The recipient may be provided several prompts and/or alerts to advise of situations which may arise related to the recommender tags and presentation channels. The prompts may provide information to the recipient about a certain condition that does not require the recipient to take corrective action. An alert may also provide information to the recipient of a more serious condition that may require the recipient to take some type of corrective action. FIGS. 5-8 are flow charts illustrating exemplary processes for providing prompts and/or alerts to the recipient to apprise the recipient of these conditions and/or situations.

Figure 5:
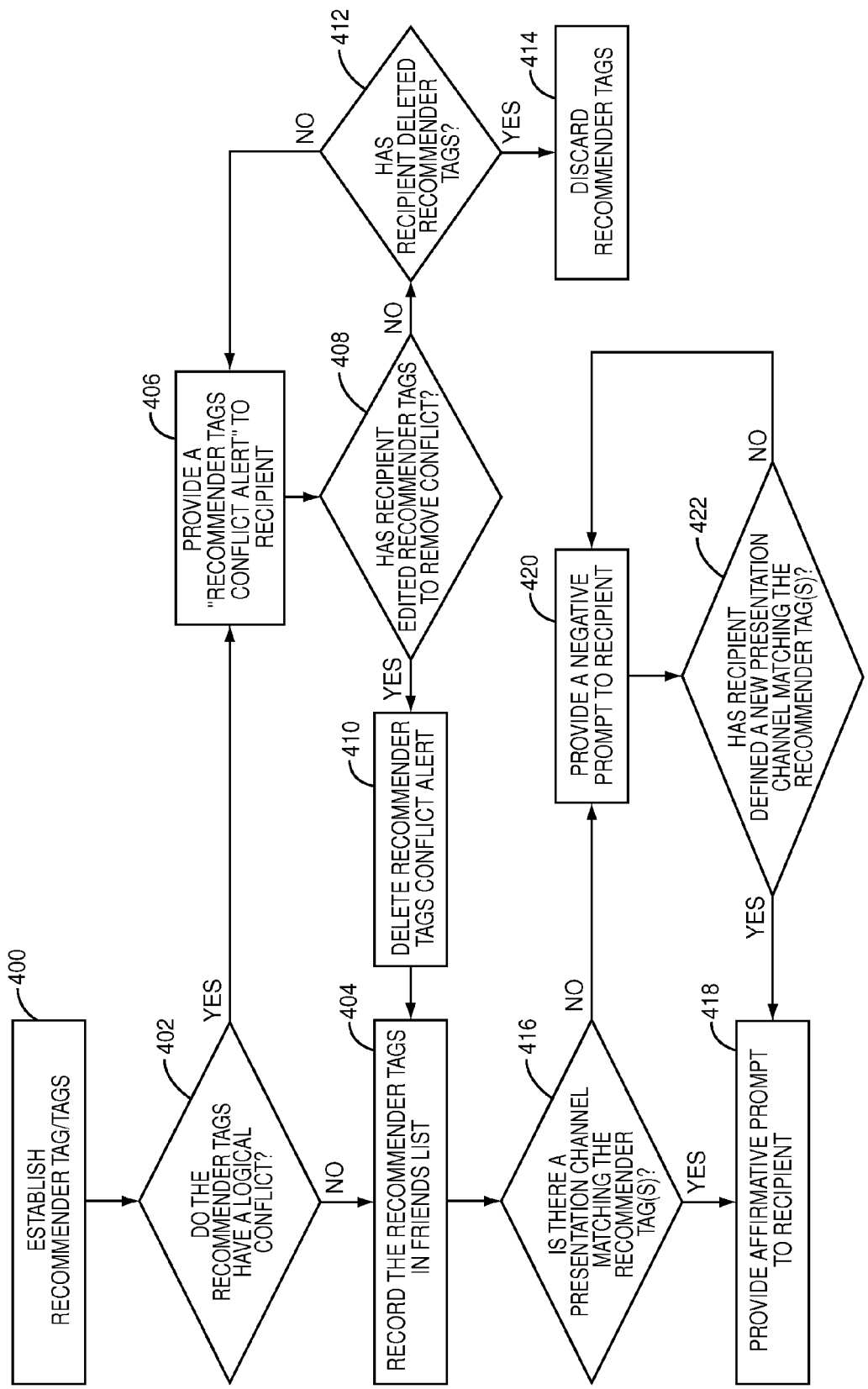
FIG. 5 is a flow chart illustrating prompts and alerts that may be provided if there is a logical conflict in a recommender's tags, according to an embodiment of the present invention.

FIG. 5 is a flow chart illustrating prompts and alerts that may be provided involving a logical conflict in a recommender's tags, according to one embodiment of the present invention. A logical conflict is when two recommender tags are mutually exclusive and thus conflict. As illustrated in FIG. 5, the process starts by establishing a recommender tag or multiple recommender tags (step 400). A determination may be made as to whether the recommender tags involve a logical conflict (step 402). In the case of a recommender having a single recommender tag, a logical conflict cannot exist. In the case of a recommender having multiple recommender tags, a logical conflict is possible. In such case, if there is no logical conflict, the recommender tags may be recorded in the friends list 28 (step 404). However, if there is a logical conflict, a "recommender tags conflict alert" may then be provided to the recipient (step 406). For example, the recipient may have tagged the recommender with two recommender tags, one recommender tag being "rock" and the other recommender tag being "not rock." Accordingly, the recommender tags are in direct conflict. Thus, they may not be recorded in the friends list 28. Because the logical conflict between the recommender tags may require the recipient to take corrective action, the alert may advise the recipient to do so. Such corrective action may be to edit the recommender tags to remove the logical conflict or, alternatively, to delete one or more of the recommender tags.

A determination may then be made as to whether the recipient has edited the recommender tags to remove the logical conflict (step 408). If the recipient has edited the recommender tags to remove the logical conflict, the recommender tags conflict alert is removed (step 410). The recommender tags may then be recorded in the friends list 28 (step 404). If the recipient has not edited the recommender tags to remove the logical conflict, a determination may be made as to whether the recipient has deleted the recommender tags (step 412). If the recipient has not deleted the recommender tags, the recommender tags conflict alert may continue to be provided to the recipient (step 406). If the recipient has deleted the recommender tags, the recommender tags may be discarded (step 414).

Once the recommender tag or tags are recorded in the friends list 28, a determination may be made as to whether there is a presentation channel that matches the recommender tag or tags (step 416). If there is a presentation channel that matches the recommender tag or tags, an affirmative prompt may be provided to the recipient (step 418). The affirmative prompt may be in the form of any type of visual indication such as a light turning on or changing and/or the word "YES" in a graphical user interface (GUI) presented to the recipient, for example. If there is no presentation channel that matches the recommender tag or tags (step 416), a negative prompt may be provided to the recipient (step 420). Similar to the affirmative prompt, the negative prompt may be in the form of any visual indication, such as a light turning on or changing and/or the word "NO" in a GUI presented to the recipient, for example. A determination may be made as to whether the recipient has defined a new presentation channel that matches the recommender tag or tags (step 422). If the recipient has defined such a new presentation channel, the affirmative prompt may be provided (step 418). In other words, the light turns off or changes and/or the word "NO" may change to the word "YES," for example. If the recipient has not defined such a new presentation channel, the negative prompt may remain (step 420).

Figure 6:
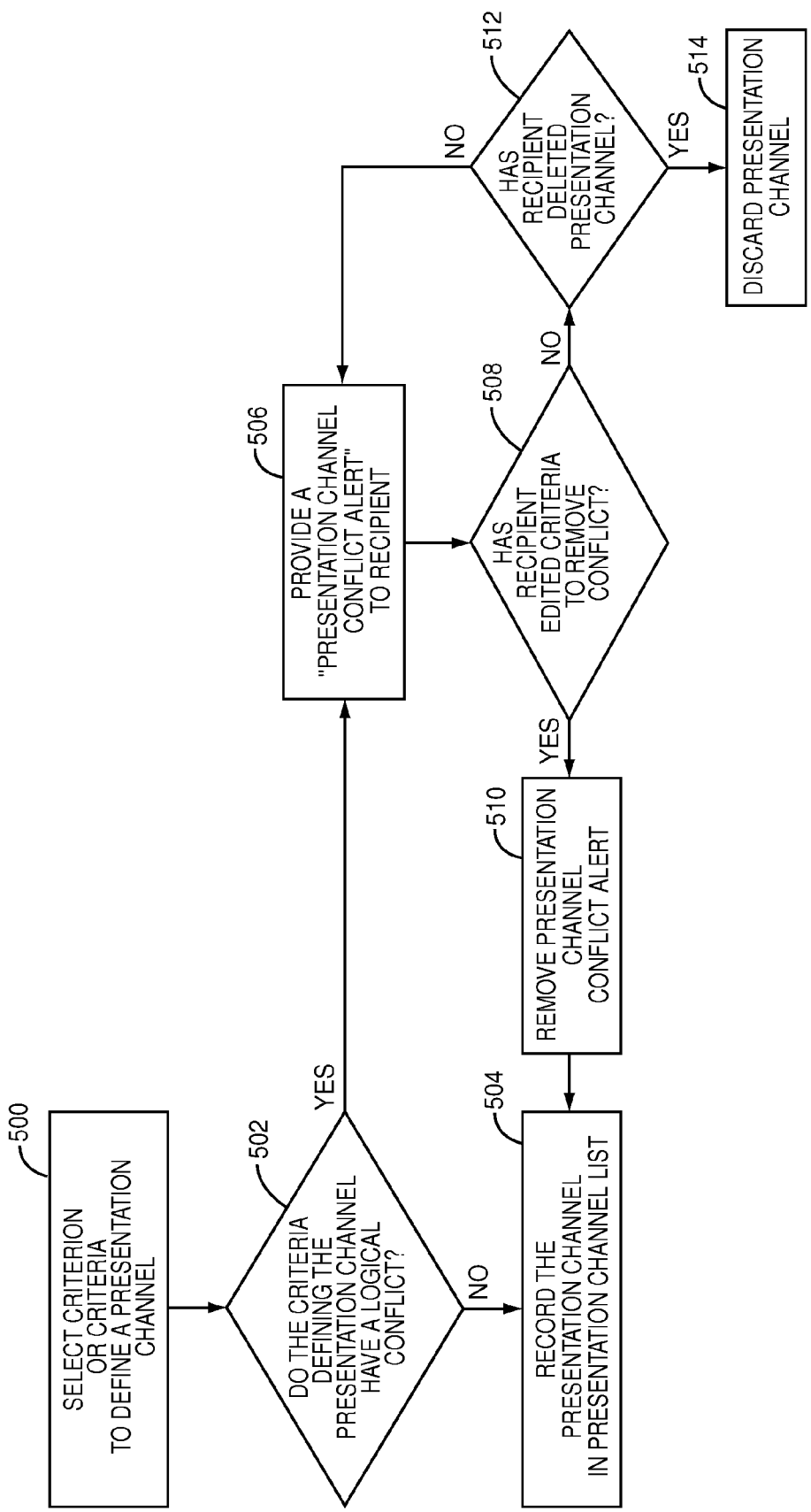
FIG. 6 is a flow chart illustrating an alert that may be provided if there is a logical conflict in criteria selected for a presentation channel, according to an embodiment of the present invention.

Prompts and/or alerts may also be provided with respect to the criterion and criteria defining the presentation channel, including logical conflicts in criteria defining a presentation channel. FIG. 6 is a flow chart illustrating an alert that may be provided to the recipient if criteria defining the presentation channel provide a logical conflict, according to one embodiment of the present invention. FIG. 6 is provided to show how a logical conflict may be handled.

As illustrated in FIG. 6, the process starts by selecting a criterion or criteria to define a presentation channel (step 500). A determination is made whether the criteria selected comprise a logical conflict (step 502). In the case of the presentation channel defined by a single criterion, a logical conflict cannot exist. In the case of a presentation channel defined by multiple criteria, a logical conflict is possible. If there is no logical conflict, the presentation channel and the criteria may be recorded in the presentation channel list 30 (step 504). If there is a logical conflict, a "presentation channel conflict alert" may then be provided to the recipient (step 506). Because the logical conflict in the criteria may require the recipient to take corrective action, the alert may advise the recipient to do so. Such corrective action may be to edit the criteria to remove the logical conflict or, alternatively, to delete the presentation channel.

A determination may then be made as to whether the recipient has edited the criteria to remove the conflict (step 508). If the recipient has edited the criteria to remove the conflict, the presentation channel conflict alert is removed (step 510). The presentation channel may then be recorded in the presentation channel list 30 (step 504). However, if the recipient has not edited the criteria to remove the conflict (step 508), a determination may be made as to whether the recipient has deleted the presentation channel (step 512). If the recipient has not deleted the presentation channel, the presentation channel conflict alert may continue to be provided (step 506). If the recipient has deleted the presentation channel, the presentation channel may be discarded (step 514).

Figure 7:
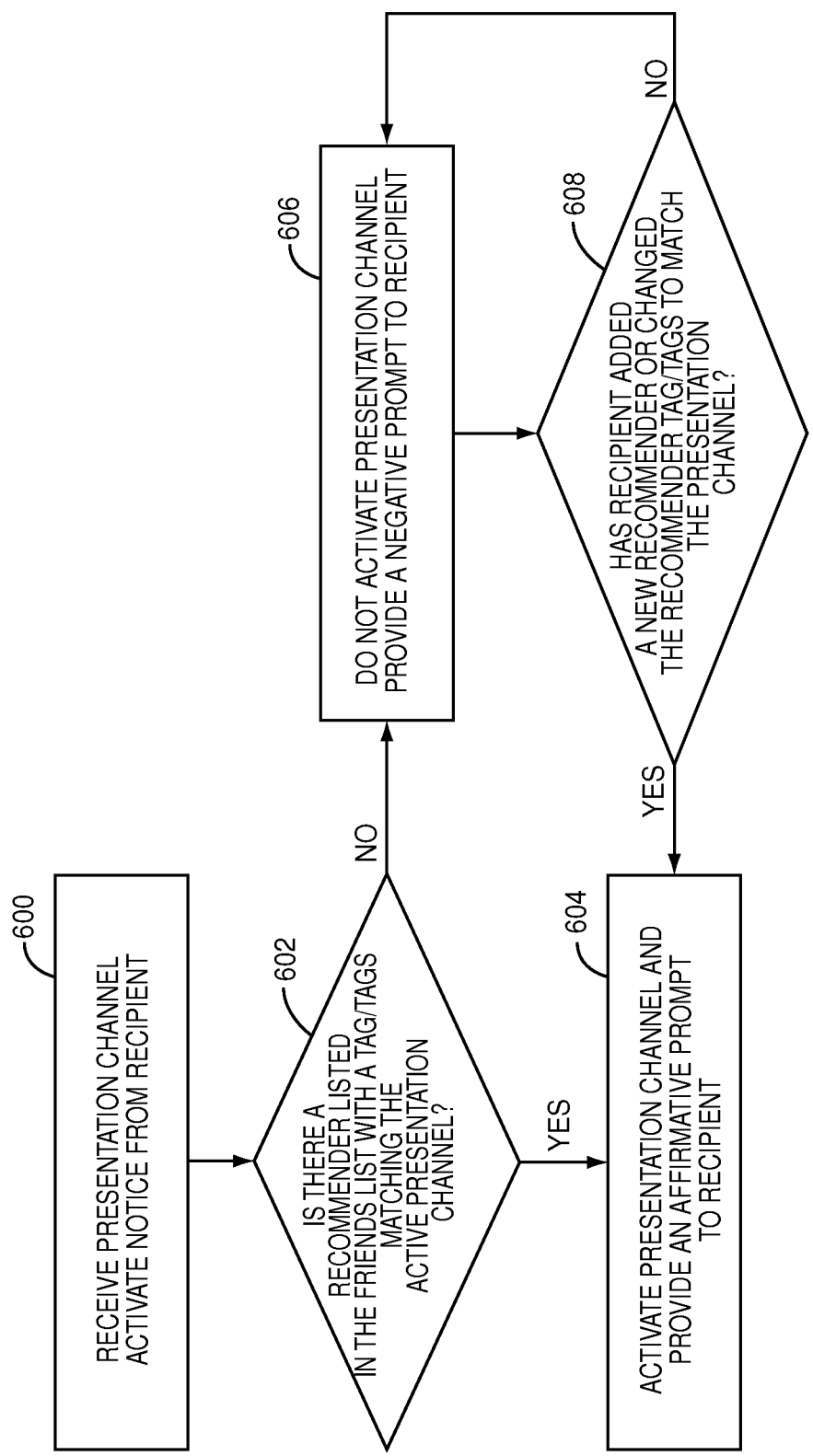
FIG. 7 is a flow chart illustrating a process that may be used for providing a prompt to the recipient based on whether a recommender tag matches the activated presentation channel, according to an embodiment of the present invention.

If the recipient attempts to activate a presentation channel and there are no recommenders listed in the friends list 28 having recommender tag or tags that match the presentation channel, the presentation channel may not be activated. A prompt may be provided to advise the recipient of such a situation. This is because selection of the presentation channel may filter out all recommenders. FIG. 7 is a flow chart illustrating the process that may be used for providing the prompt to the recipient, according to one embodiment of the present invention.

The process begins with receiving a presentation channel activate notice from the recipient (step 600). A determination may then be made as to whether there is a recommender listed in the friends list 28 with a recommender tag or tags that match the active presentation channel (step 602). If there is a recommender listed in the friends list 28 having a matching recommender tag or tags, the presentation channel may then be activated in response to the recipient's notice and an affirmative prompt may be provided to the recipient (step 604). The affirmative prompt may be in the form of any visual indication such as a light turning on or changing and/or the word "YES" in a GUI presented to the recipient, for example. If there is no recommender listed in the friends list 28 having a matching recommender tag or tags, the presentation channel may not activate and a negative prompt may be provided to the recipient (step 606). The negative prompt may be in the form of any visual indication such as a light turning on or changing and/or the word "NO" in a GUI presented to the recipient, for example.

If there is no recommender listed in the friends list 28 having a tag or tags matching the requested presentation channel, the process may check to see whether the recipient has added a new recommender to the friends list 28 and/or changed the recommender tag or tags of an existing recommender in the friends list 28. If so, a recommender tag or tags may have been added that matches such presentation channel (step 608). If such a match comes into existence, the presentation channel may activate and the affirmative prompt may be provided to the recipient (step 604). In other words, the light may turn off or change and/or the word "NO" may change to the word "YES," for example. If no match still exists, then the presentation channel may not activate and the negative prompt may remain (step 606).

There may also be operational conflicts where the recommender tag or tags match the active presentation channel, but the recipient may not have received media item recommendations from the particular recommender. This may be an indication that the recommender has not been effectively tagged. The recipient may pre-define a triggering condition in the event of the operational conflict occurring. Then, if the operational conflict occurs and persists in a manner that initiates the triggering condition, a prompt may be provided to the recipient. In this manner, the recipient may be advised that a recommender may have an inappropriate recommender tag or tags and/or may not be the appropriate recommender for certain types of media item recommendations.

Figure 8:
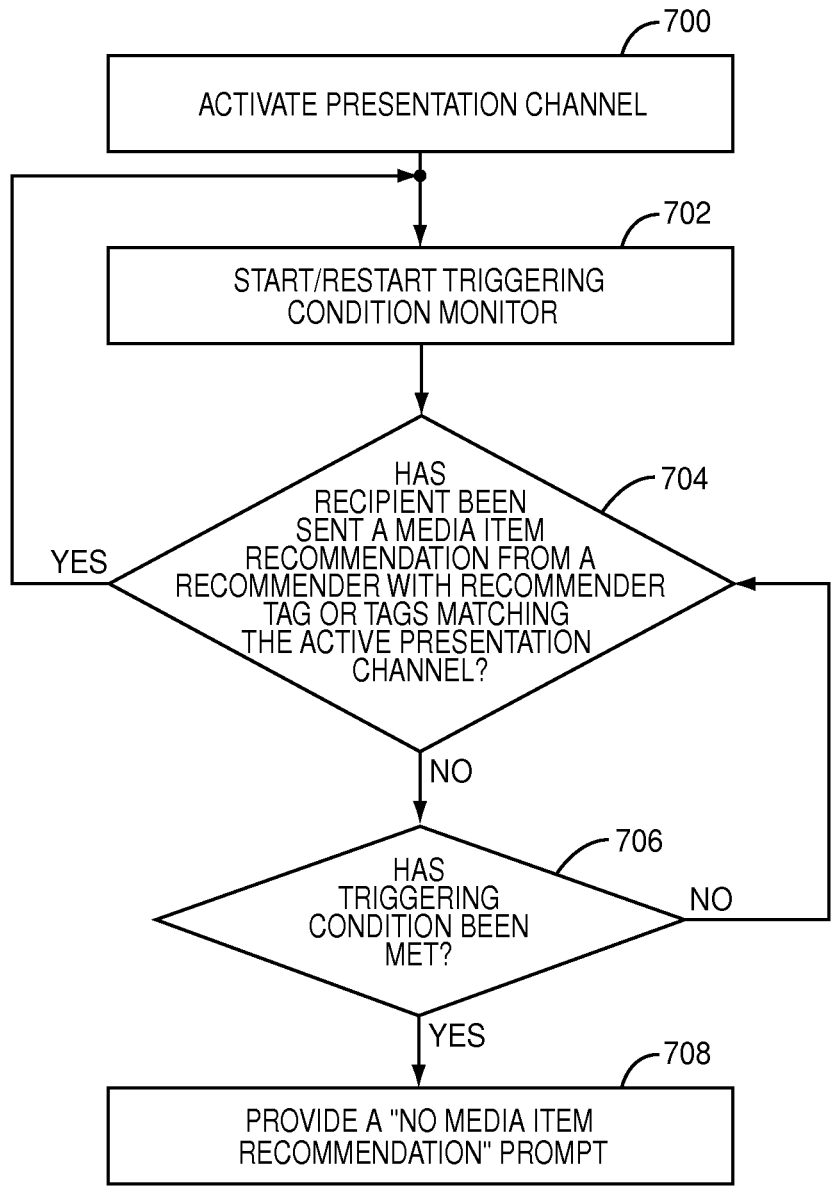
FIG. 8 is a flow chart illustrating a process for providing a prompt to the recipient if there is an operational conflict for a particular recommender, wherein a media item recommendation from a recommender with a recommender tag matching the criterion of an active presentation channel has not been sent to the recipient, according to an embodiment of the present invention.

FIG. 8 is a flow chart that illustrates the process for providing a prompt to the recipient upon detection of an operational conflict. As discussed above, an operational conflict may occur when no media item recommendations from a recommender with a recommender tag or tags matching the active presentation channel have been sent to the recipient. The triggering condition for detecting an operational conflict may be based on any condition, including, but not limited to, time and/or the number of media item recommendations from other recommenders. As examples, the prompt may be provided if no media item recommendations from the recommender were sent to the recipient after three (3) days since the recommender and the recommender's tag or tags were recorded in the friends list 28; ninety (90) minutes has elapsed since the time the presentation channel was activated; and/or sixty (60) media item recommendations from other similarly tagged recommenders were sent to the recipient. In response, the recipient may elect to take corrective action, such as changing the recommender tag or tags of the recommender. The examples set forth above are exemplary only and in no manner limit the present invention.

As illustrated in FIG. 8, the process begins when a presentation channel is activated (step 700). Upon the presentation channel being activated, a triggering condition monitor is started (step 702). A determination is made as to whether the recipient has been sent a media item recommendation from a recommender having a recommender tag or tags that match the active presentation channel (step 704). If a media item recommendation from the recommender has been sent to the recipient, the triggering condition monitor is restarted, meaning there is no operational conflict at this time (step 702). If a media item recommendation has not been sent to the recipient from the recommender, a determination is made as to whether the triggering condition has been met (step 706). If the triggering condition has been met, a "no media item recommendation" prompt may be provided to the recipient to indicate the operational conflict (step 708). If the triggering condition has not been met, the process continues to monitor whether media item recommendations have been sent by the recommender (step 704).

The prompts and/or alerts discussed above may be presented to the recipient using GUIs. Also, the GUIs may allow the recipient to effectively interact with the media item recommendation system 10 and implement the recommender filtering functions and other functions and/or processes as described herein. As such, the GUIs may allow the recipient to select the manner in which the recommenders are filtered and to respond to the prompts or alerts such that the selected recommenders continue to be filtered in the manner desired by the recipient. It should be noted that any actuator, selector, or indicator described with respect to any GUI herein is not meant in any manner to be limiting, and any type and/or character of actuator, selector, or indicator may be used in the present invention. Additionally, when describing an action performed by clicking or double-clicking on a visual representation and/or icon in a GUI, such action is exemplary only and does not limit the manner in which any such actuation may be performed in the present invention.

Figure 9:
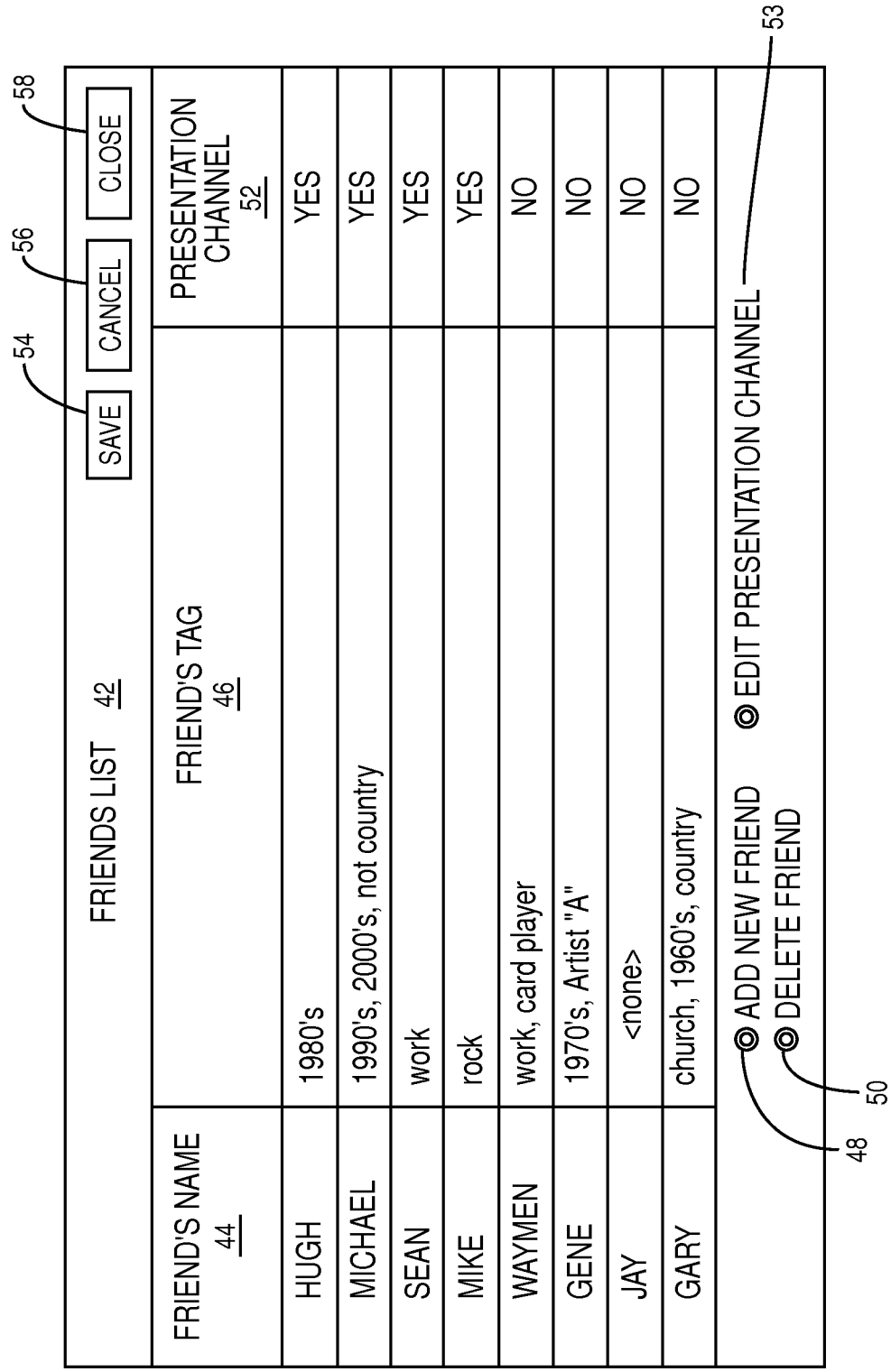
FIG. 9 is an exemplary friend list graphical user interface (GUI) illustrating a manner in which information included in a friends list may be presented to the recipient, according to an embodiment of the present invention.

FIG. 9 is an exemplary friends list GUI 42 illustrating a manner in which the information included in the friends list 28 may be presented to the recipient and tagged, according to one embodiment of the present invention. FIG. 9 is provided to show how the friends list GUI 42 may allow the recipient to select the recommenders from whom the recipient desires to have media item recommendations sent. The friends list GUI 42 may be any type of presentation, including, but not limited to, a window or slide for example.

The friends list GUI 42 may include a friend's name field 44 listing the names of the recommenders in the media item recommendation system 10 from whom the recipient desires to receive media item recommendations. The friend's name field 44 may provide any type of unique identifier for the recommenders, such as a nick-name and/or other alternate descriptor. A friend's tag field 46 may show the tags the recipient associates with each of the recommenders listed in the friend's name field 44.

The recipient may add a recommender to the friends list 28 by selecting and actuating an "ADD NEW FRIEND" actuator 48. Upon actuating the "ADD NEW FRIEND" actuator 48, a blank line in the friend's name field 44 and the friend's tag field 46 may appear allowing the recipient to enter the name or other descriptor for the recommender and any tag that the recipient desires to associate with the recommender. Additionally, the recipient may desire to delete a recommender from the friends list 28. In such case, the recipient may do so by selecting that recommender, for example by clicking on that recommender's name in the friend's name field 44, and then actuating a "DELETE FRIEND" actuator 50. The recommender and the recommender tag or tags may then be deleted from the friend's name field 44 and the friend's tag field 46, respectively. In FIG. 9, the actuators 48, 50 are shown as radio buttons, but the present invention is not limited to any particular type of actuator and, accordingly, any type or means of actuation may be used.

Figure 10:
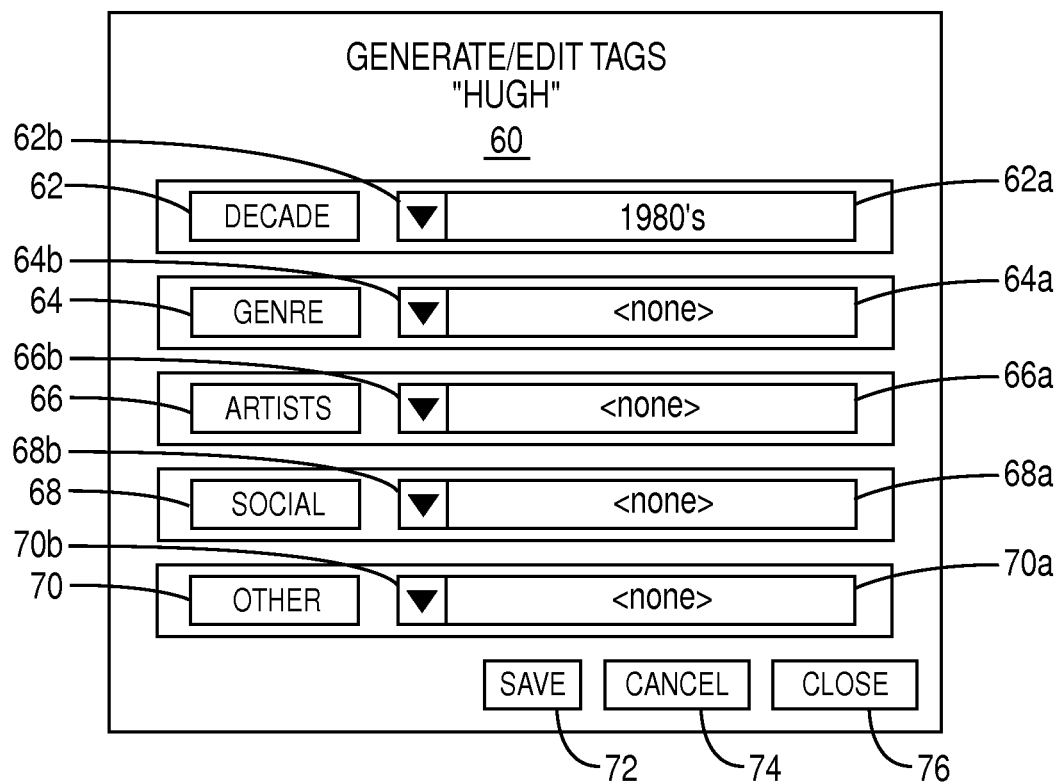
FIG. 10 is an exemplary generate/edit recommender tag GUI for editing recommender tags, according to an embodiment of the present invention.

If the recipient desires to edit the recommender tag or tags in the friend's tag field 46, the recipient may double-click on the particular recommender tag, for example. This action may open a generate/edit tags screen allowing the recipient to edit the friend's tag field 46. Such a screen is illustrated in FIG. 10, which is discussed below.

The friends list GUI 42 may also include a presentation channel field 52. The presentation channel field 52 may provide the recipient with a prompt indicating whether the recipient has defined a presentation channel matching the recommender tag or tags associated with the particular recommender. In FIG. 9, the friends list GUI 42 shows that the recipient has defined presentation channels matching recommender tags associated with the recommenders "Hugh," "Michael," "Sean," and "Mike." The recipient has not defined a presentation channel matching the recommender tags associated with the recommenders "Waymen," "Gene," "Jay," and "Gary."

Figure 11:
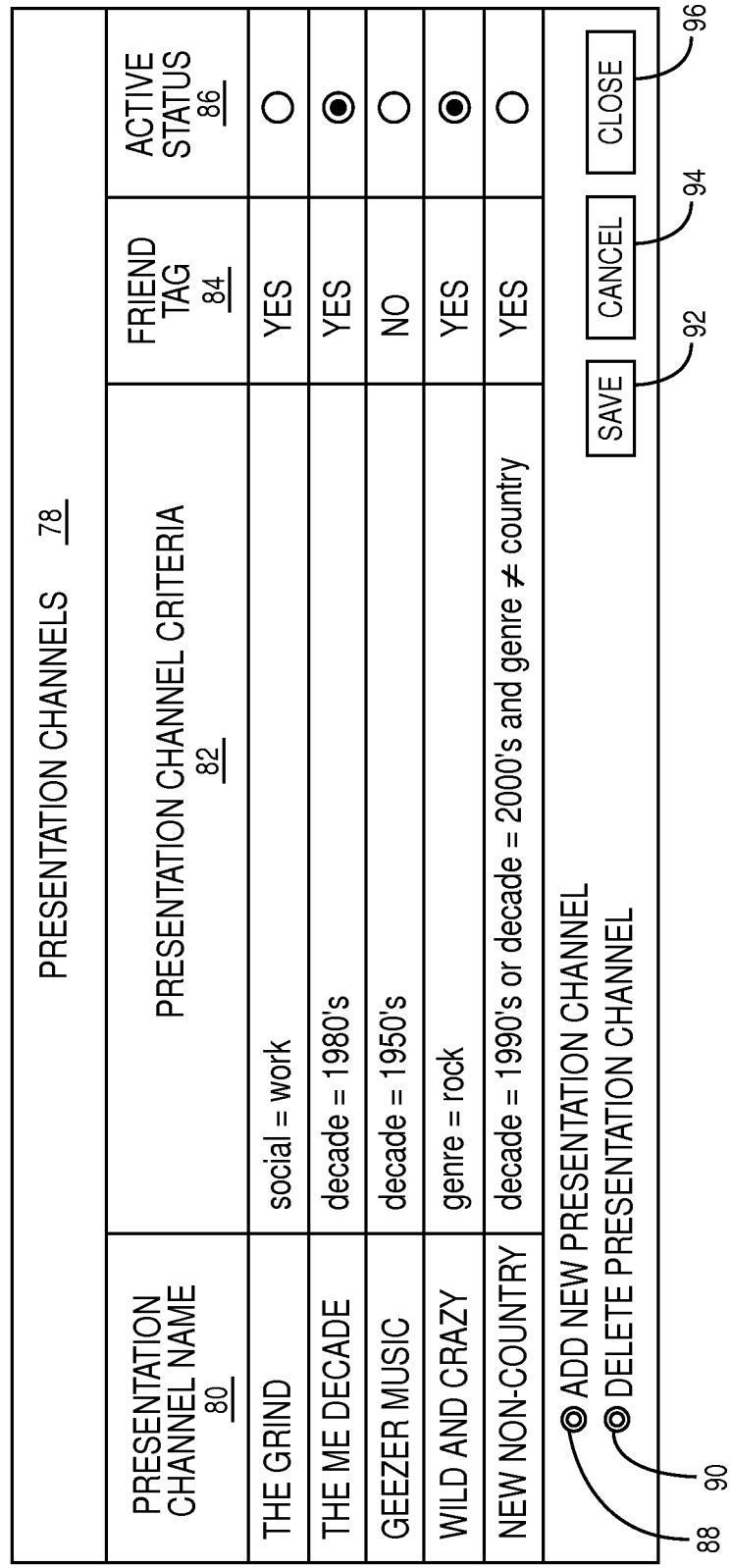
FIG. 11 is an exemplary presentation channels GUI illustrating a manner in which presentation channels may be presented to the recipient, according to an embodiment of the present invention.

The friends list GUI 42 may also include an "EDIT PRESENTATION CHANNEL" actuator 53. If the recipient desired to edit the presentation channel, the recipient may actuate the "EDIT PRESENTATION CHANNEL" actuator 53 and a presentation channels screen may open. Such a screen is illustrated in FIG. 11, which is discussed below.

The friends list GUI 42 may also include a "SAVE" button 54. The recipient may actuate the "SAVE" button 54 by clicking on it, for example, to save any changes made by the recipient to the friends list GUI 42. A "CANCEL" button 56 may be included in the friends list GUI 42. The recipient may actuate the "CANCEL" button 56 by clicking on it, for example, to allow the recipient to cancel any non-saved changes the recipient made to the friends list GUI 42. Also, a "CLOSE" button 58 may be included. The recipient may actuate the "CLOSE" button 58 by clicking on it, for example, to close the friends list GUI 42. If the recipient elects to close the friends list GUI 42 and the recipient has not saved any changes made, a prompt (not shown) may be presented to the recipient to inquire whether the recipient desires to save the changes.

As mentioned above, if the recipient desires to edit the recommender tag or tags for a particular recommender, the recipient may double-click on the recommender tag for the particular recommender in the friend's tag field 46, for example. This action may open a screen for editing the friend's tag field 46 for that recommender. FIG. 10 illustrates such a screen in the form of an exemplary generate/edit recommender tag GUI 60, according to one embodiment of the present invention. The generate/edit recommender tag GUI 60 may be any type of presentation, including, but not limited to, a window or slide for example.

The generate/edit recommender tag GUI 60 is shown as being for the recommender "Hugh." Accordingly, the generate/edit recommender tag GUI 60 in FIG. 10 may have opened when the recipient double-clicked on the friend's tag field 46 in FIG. 9 for "Hugh." However, the generate/edit recommender tag GUI 60 may be a similar format for each recommender listed in the friend's name field 44 in FIG. 9.

The generate/edit recommender tag GUI 60 may include one or more tag fields 62, 64, 66, 68, 70, which allow the recipient to view and edit the current recommender tags for the selected recommender. FIG. 10 shows that a "DECADE" tag field 62 has a decade tag 62a, which is "1980's." The "GENRE" tag field 64, "ARTISTS" tag field 66, "SOCIAL" tag field 68, and "OTHER" tag field 70 have no tags. This is represented by "<none>" in 64a, 66a, 68a, and 70a, respectively.

If the recipient desires to change the decade tag 62a of the "DECADE" tag field 62 and/or provide tags for 64a, 66a, 68a, and 70a, the recipient may select that tag field by clicking on the desired tag button 62b, 64b, 66b, 68b, 70b. For example, by clicking on decade tag button 62b, a drop down menu (not shown) may appear under the decade tag 62a. The drop down menu may have a list of pre-defined tags for the "DECADE" tag field 62. In the case of the "DECADE" tag field 62, the pre-defined tag may be each decade from which the recipient may select the pre-defined tag for the decade tag 62a.

Alternatively and/or additionally, the recipient may enter a non-pre-defined tag into the decade tag 62a. For example, the pre-defined tag for the "DECADE" tag field 62 may not include the decade of the 1950's. However, the recipient may believe that the recommender may be a connoisseur of early rock-and-roll. In such case, the recipient may enter "1950's" as the decade tag 62a directly without using the drop down menu.

Also, the "OTHER" tag field 70 allows the recipient to enter a tag 70a that does not fit within one of the tag fields 62, 64, 66, 68. This allows the recipient to customize the "OTHER" tag field 70 to the recipient's own particular needs and desires. For example, the recipient may decide to provide a recommender with the recommender tag "pick-me-up." At certain times, the recipient may desire some particular type of music that is fast and energetic and, accordingly, be sent media item recommendations from a particular recommender who the recipient believes can provide the best "pick-me-up" music. Therefore, the recipient associates the "pick-me-up" tag with that recommender by providing a "pick-me-up" tag 70a. The "pick-me-up" tag 70a may then be saved. The recipient may then receive recommendations from that recommender by activating a "pick-me-up" presentation channel.

Similar to the friends list GUI 42, the generate/edit recommender tag GUI 60 may also include a "SAVE" button 72. The recipient may actuate the "SAVE" button 72 by clicking on it, for example, to save any changes made by the recipient to the generate/edit recommender tag GUI 60. A "CANCEL" button 74 may be included in the generate/edit recommender tag GUI 60. The recipient may actuate the "CANCEL" button 74 by clicking on it, for example, to allow the recipient to cancel any non-saved changes the recipient made to the generate/edit recommender tag GUI 60. Additionally, a "CLOSE" button 76 may be included. The recipient may actuate the "CLOSE" button 76 by clicking on it, for example, to close the generate/edit recommender tag GUI 60. As with the friends list GUI 42, if the recipient elects to close the generate/edit recommender tag GUI 60 and the recipient has not saved any changes made, a prompt (not shown) may be presented to the recipient to inquire whether the recipient desires to save the changes. Also, closing the generate/edit recommender tag GUI 60 presents the friends list GUI 42 again to the recipient, and the recipient may continue to perform any action associated with the friends list GUI 42 as discussed above.

Another action the recipient may perform involving the friends list GUI 42 may be to open a screen which shows information related to the presentation channels. By actuating the "EDIT PRESENTATION CHANNEL" actuator 53 in FIG. 9 for example, a presentation channel screen may open. FIG. 11 illustrates a presentation channel screen in the form of an exemplary presentation channels GUI 78, according to one embodiment of the present invention. The presentation channels GUI 78 may allow the recipient to establish and name a presentation channel and to define the presentation channel with criterion or criteria that correspond to the recommender tag or tags that may have been associated with a recommender. The presentation channels GUI 78 may also allow the recipient to edit, add, and/or delete the presentation channels and/or any information involving the presentation channels. The presentation channels GUI 78 may be any type of presentation, including, but not limited to, a window or slide, for example.

The presentation channels GUI 78 may include a presentation channel name field 80 and a presentation channel criteria field 82. The presentation channel name field 80 may list the names that the recipient has given to the presentation channels. The presentation channel criteria field 82 may list the criterion or criteria defining the presentation channels. The presentation channels GUI 78 may also include a friend tag field 84, which provides a prompt indicating whether there is a recommender with a recommender tag or tags that matches the criterion or criteria listed in the presentation channel criteria field 82 for the particular presentation channel. For example, the presentation channels GUI 78 indicates that there are recommenders with recommender tags satisfying the criterion or criteria of the presentation channels "The Grind," "The Me Decade," "Wild and Crazy," and "New Non-Country." The presentation channel criteria field 82 indicates that the "Geezer Music" presentation channel is defined by the criterion "decade=1950's." Since there is no recommender with the recommender tag that satisfies that criterion, a prompt is provided indicating that the "Geezer Music" presentation channel may not be activated. This prompt may advise the recipient that no media item recommendations may be sent to the recipient if the recipient desires to activate the "Geezer Music" presentation channel. The recipient may then elect to edit the friend tag as shown in FIG. 11, delete the "Geezer Music" presentation channel, or take no action.

The presentation channels GUI 78 may also include an active status field 86 which may indicate which presentation channels are currently active. This may provide a prompt to the recipient so that the recipient may be aware of the manner in which the recommender may be filtered. For example, the presentation channels GUI 78 shows that "The Me Decade" and the "Wild and Crazy" presentation channels are currently active. In this manner, the recipient is advised that the media item recommendations from the recommenders with recommender tags matching the "The Me Decade" and the "Wild and Crazy" presentation channels may be sent to the recipient.

In this embodiment of the present invention, radio buttons are used to indicate whether or not the presentation channel is active. The recipient may activate or de-activate the presentation channel by clicking on the radio button for that presentation channel in the active status field 86, for example. Although radio buttons are shown in FIG. 11, any type of indicator and/or actuator may be used and the present invention is not limited to the use of radio buttons or any other particular type of indicator and/or actuator.

The recipient may edit the presentation channel name by selecting the particular name in the presentation channel name field 80 by clicking on it, for example, and entering the edits the recipient desires. Similarly, the recipient may edit the criterion or criteria defining the presentation channel by selecting the particular presentation channel in the presentation channel criteria field 82 by clicking on it, for example, and entering the edits that the recipient desires.

The recipient may add a new presentation channel to the presentation channel list 30 by selecting and actuating an "ADD NEW PRESENTATION CHANNEL" actuator 88. Upon actuating the "ADD NEW PRESENTATION CHANNEL" actuator 88, a blank line in the presentation channel name field 80 and the presentation channel criteria field 82 may appear. The recipient may enter the name for the new presentation channel and the criterion or criteria by which the recipient desires to define the new presentation channel. Additionally, if the recipient desires to delete a presentation channel from the presentation channel list 30, the recipient may do so by highlighting or in any manner selecting that presentation channel, for example by clicking on that presentation channel in the presentation channel name field 80, and then actuating a "DELETE PRESENTATION CHANNEL" actuator 90.

In a similar manner to the friends list GUI 42, the presentation channels GUI 78 may also include a "SAVE" button 92. The recipient may actuate the "SAVE" button 92 by clicking on it, for example, to save any changes made by the recipient to the presentation channels GUI 78. A "CANCEL" button 94 may be included in the presentation channels GUI 78. The recipient may actuate the "CANCEL" button 94 by clicking on it, for example, to allow the recipient to cancel any non-saved changes the recipient made to the presentation channels GUI 78. Also, a "CLOSE" button 96 may be included. The recipient may actuate the "CLOSE" button 96 by clicking on it, for example, to close the presentation channels GUI 78. If the recipient elects to close the presentation channels GUI 78 and the recipient has not saved any changes made, a prompt (not shown) may be presented to the recipient to inquire whether the recipient desires to save the changes. Also, closing the presentation channels GUI 78 may present the friends list GUI 42 again to the recipient, and the recipient may perform any action associated with the friends list GUI 42 as discussed above.

Figure 12:
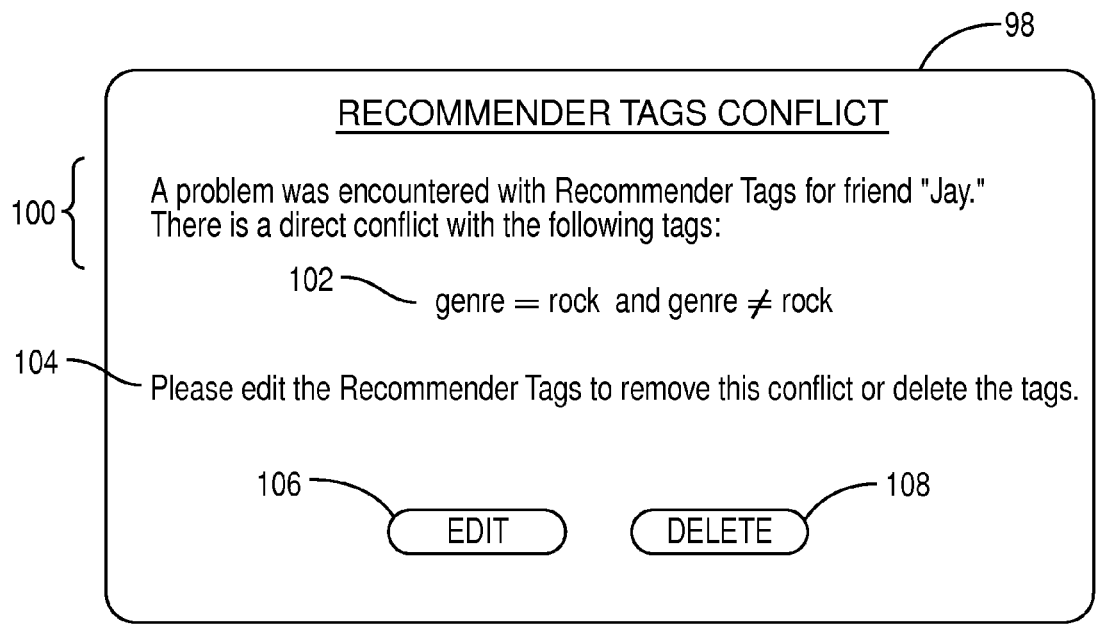
FIG. 12 is an exemplary recommender tags conflict alert GUI that advises the recipient of a logical conflict in recommender tags and provides the recipient with choices for resolving and/or correcting the logical conflict, according to an embodiment of the present invention.
Figure 13:
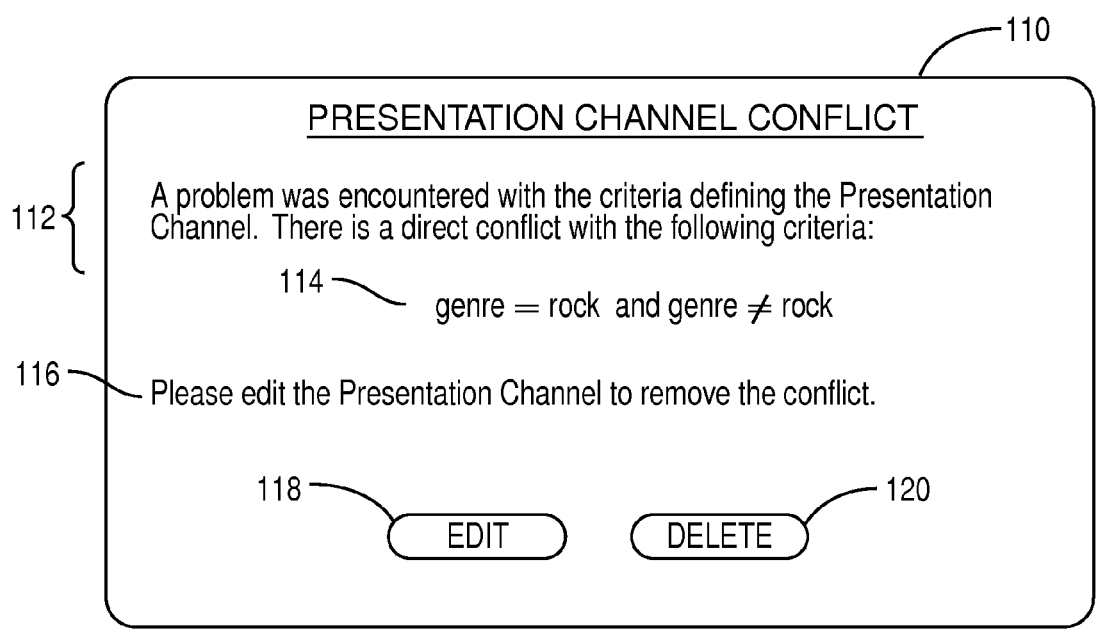
FIG. 13 is an exemplary presentation channel conflict alert GUI that advises the recipient of a logical conflict in criteria in the selected presentation channel and provides the recipient with choices for resolving and/or correcting the logical conflict, according to an embodiment of the present invention.

If the recipient is generating or editing the recommender tags of the recommender and/or defining the presentation channel with criteria, and either the recommender tags or the criteria have a logical conflict, an alert may be generated and presented to the recipient. FIGS. 12 and 13 illustrate screens in the form of GUIs that may provide such alerts to the recipient, according to one embodiment of the present invention. Logical conflicts may provide a direct logical impossibility. For example, a recommender may not at the same time have the recommender tag of "rock" music genre and the recommender tag of "not rock" music genre. A similar logical conflict may occur with the criteria defining the presentation channel. Because of the logical impossibility, the logical conflicts may result in a basic flaw in the logical functioning of the recommender filtering. As such, the logical conflict may be viewed as a serious condition affecting the ability of the recommender filter 22 to perform the necessary filtering as desired by the recipient. Therefore, correction may be required before any action may be taken involving the recommender tags and/or the criteria defining the presentation channel. The alerts may be presented to the recipient to advise of such seriousness and provide the recipient with choices of action to correct or resolve the logical conflict.

FIG. 12 illustrates a recommender tags conflict alert GUI 98 that advises the recipient of a logical conflict with the recommender tags. The recommender tags conflict alert GUI 98 provides the recipient with choices for resolving and/or correcting the logical conflict with the recommender tags, according to one embodiment of the present invention. The recommender tags conflict alert GUI 98 may include a recommender tags problem text 100. The recommender tags problem text 100 may advise the recipient that there is the logical conflict with the tags. Conflicting recommender tags 102 describe the logical conflict to the recipient. Additionally, a recommender tags resolution text 104 may provide the recipient with ways to resolve and/or correct the logical conflict.

In FIG. 12, the conflicting recommender tags 102 show the conflict as "genre=rock" and "genre≠rock." The recommender tags resolution text 104 may provide ways in which the recipient may resolve the logical conflict, such as by editing or deleting the recommender tags. An "EDIT" button 106 and a "DELETE" button 108 may be included in the recommender tags conflict alert GUI 98. By activating the "EDIT" button 106, the recipient may edit the recommender tags to remove the conflict. By activating the "DELETE" button 108, the recipient may delete the recommender tags, thereby removing the conflict.

FIG. 13 illustrates a presentation channel logical conflict alert GUI 110 that may operate in a similar fashion as the recommender tags conflict alert GUI 98. The presentation channel logical conflict alert GUI 110 advises the recipient of a logical conflict with the criteria defining the presentation channel and provides the recipient with choices for resolving and/or correcting the logical conflict. The presentation channel logical conflict alert GUI 110 may include a presentation channel problem text 112. The presentation channel problem text 112 may advise the recipient that there is the logical conflict. The presentation channel logical conflict alert GUI 110 may also include a presentation channel conflicting criteria 114 describing the logical conflict to the recipient. Further, the presentation channel logical conflict alert GUI 110 may also include a presentation channel resolution text 116.

The presentation channel resolution text 116 may provide the recipient with ways to resolve and/or correct the logical conflict.

In FIG. 13, the presentation channel conflicting criteria 114 shows the conflict as "genre=rock" and "genre≠rock." The presentation channel resolution text 116 may provide ways in which the recipient may resolve the logical conflict, either by editing or deleting the presentation channel. An "EDIT" button 118 and a "DELETE" button 120 may be included in the presentation channel logical conflict alert GUI 110. By activating the "EDIT" button 118, the recipient may edit the presentation channel to remove the conflict. By activating the "DELETE" button 120, the recipient may delete the presentation channel, thereby removing the conflict.

The above embodiments illustrating the processes and GUIs for determining and presenting prompts and alerts to the recipient are not inclusive of all the prompts and alerts that may be determined and presented, and the present invention is not limited thereby. As such, other prompts and alerts may be included. One such prompt and alert may concern a situation in which the recipient adds a new recommender to the friends list 28 but does not associate a tag or tags with that new recommender. The friends list GUI 42 in FIG. 9 illustrates such a situation with respect to the recommender "Jay." Although "Jay" is listed in the friend's name field 44, no attribute is listed in the friend's tag field 46. Therefore, "Jay" does not have a recommender tag.

However, "Jay" may send media item recommendations for media items that may fit into an active presentation channel, for example "The Me Decade" presentation channel. Such media item recommendations may not be sent to the recipient as the recommender filter 22 may filter out "Jay," because "Jay" does not have a recommender tag that matches the active presentation channel. However, "Jay's" media item recommendations may be useful information for the recipient in determining what recommender tag to give to "Jay." Accordingly, listing "Jay's" media item recommendations which satisfy an active presentation channel in an alert queue may benefit the recipient. The recipient may then view "Jay's" media item recommendations. The recipient may use those media item recommendations as the recipient may consider appropriate to establish a recommender tag or tags for "Jay."

Figure 14A:
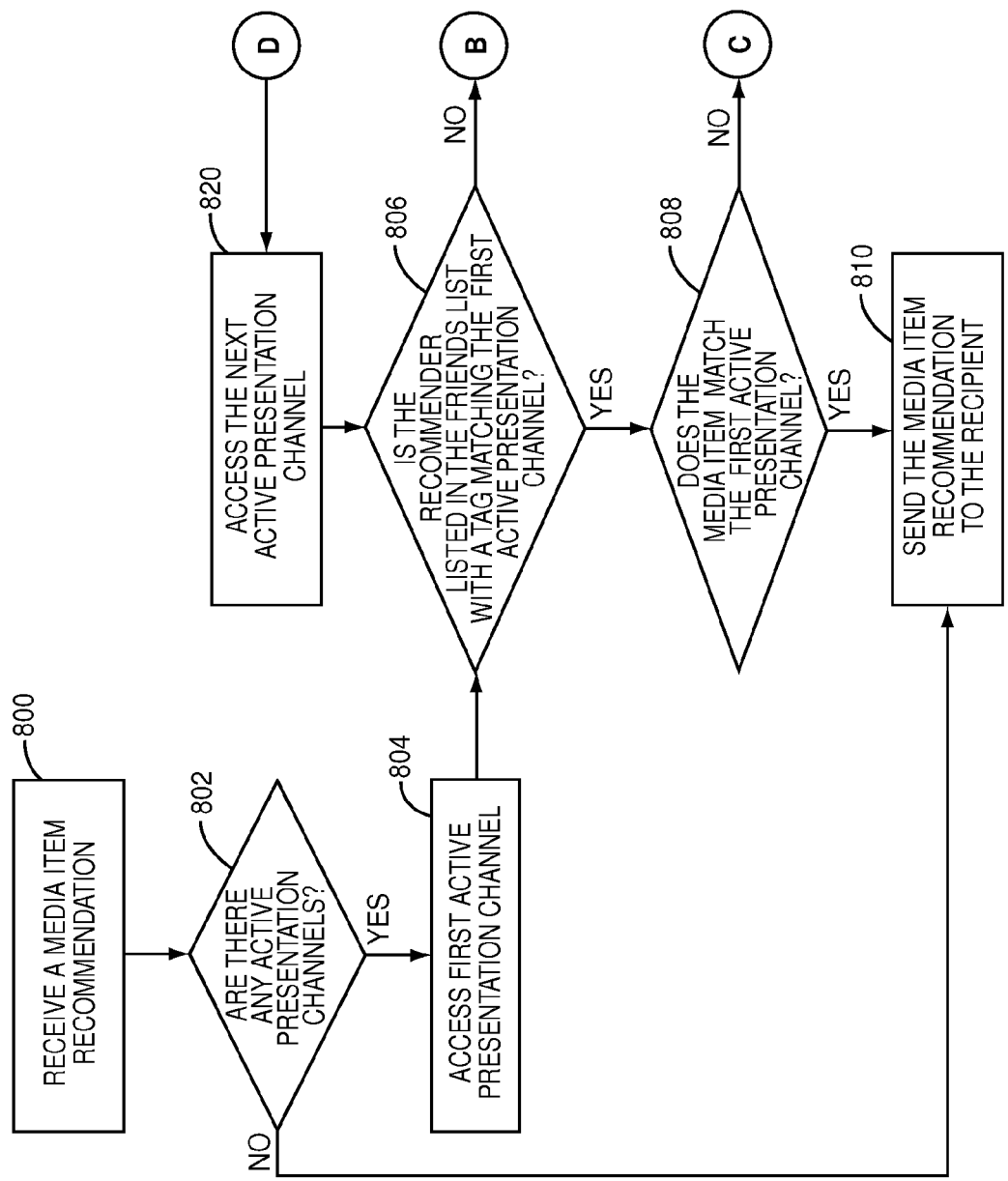
FIGS. 14A and 14B are flow charts illustrating an exemplary process for providing an alert of a new recommender's media item recommendations in the form of an alert queue, and the manner in which the alert may interact with and/or affect the process of filtering recommenders, according to an embodiment of the present invention.
Figure 14B:
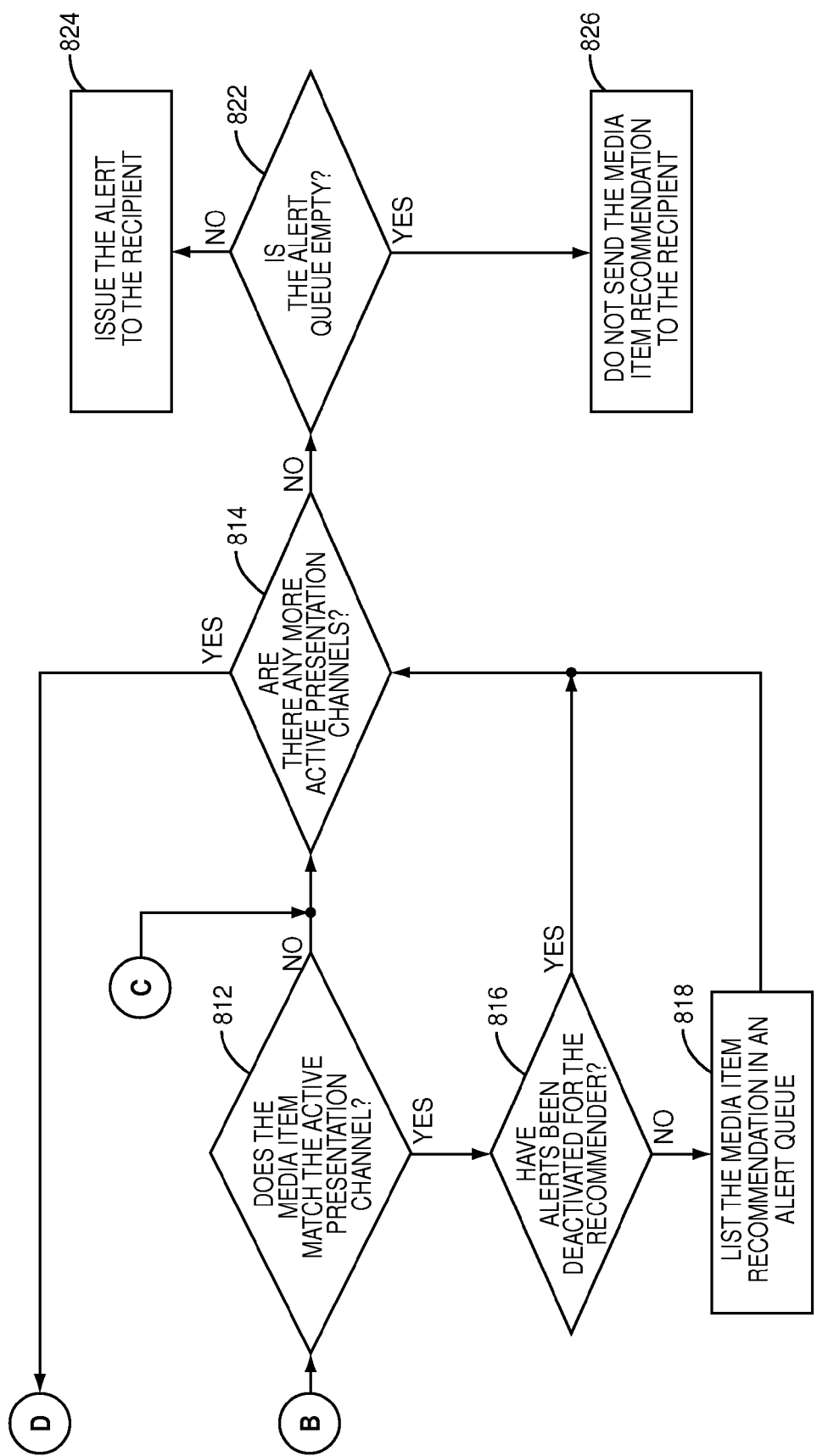

FIGS. 14A and 14B are provided to illustrate the manner in which a prompt or alert may interact with and/or affect the process of filtering recommenders, according to one embodiment of the present invention. FIGS. 14A and 14B include the basic processing of filtering recommenders in FIGS. 4A and 4B. As illustrated in FIG. 14A, the process begins by receiving a media item recommendation (step 800). Upon receipt of the media item recommendation, a determination may be made as to whether there are any active presentation channels (step 802). If there are one or more active presentation channels, the first active presentation channel listed may be accessed (step 804). Accessing the first active presentation channel may be performed by the recommender filter 22 searching the presentation channel list 30 in the user database 18. Once the first active presentation channel is accessed, the recommender filter 22 may search the friends list 28 of the user database 18 to determine whether the recommender is listed in the friends list 28, and if the recommender is tagged with the recommender tag or tags that match the first active presentation channel (step 806).

If the recommender is tagged with the tag or tags that match the first active presentation channel, a determination may be made as to whether the media item being recommended also matches the first active presentation channel (step 808). If the media item being recommended matches the first active presentation channel, the media item recommendation may be sent to the recipient (step 810). If the media item being recommended does not match the first active presentation channel, a determination may be made whether there are other active presentation channels (step 814). Referring again to step 802, if there are no active presentation channels, the media item recommendation may be sent to the recipient as a default step (step 810). In this manner, the recommendation client application 24 may assume that if the recipient activated no presentation channels, the recipient may be disregarding the recommender filtering process and thereby desires to receive media item recommendations without the recommender being filtered.

If the recommender is not tagged with the tag or tags that match the first active presentation channel (step 806), a determination may still be made as to whether the media item recommended by the recommender matches the active presentation channel (step 812). If the media item does not match the active presentation channel, a determination may then be made as to whether there are any more active presentation channels (step 814). If, on the other hand, the media item does match the active presentation channel, a determination may then be made as to whether alerts have been deactivated with respect to the recommender (step 816). If the alerts have been deactivated with respect to the recommender, the process proceeds to determine if there are any other active presentation channels (step 814). If the alerts have not been deactivated with respect to the recommender, the media item recommendation is listed in an alert queue (step 818) and the process then proceeds to determine if there are any other active presentation channels (step 814).

If there are other active presentation channels, the next active presentation channel may be accessed (step 820) and the process loops back to step 806 and again proceeds through the subsequent steps. If there are no other active presentation channels, a determination may be made as to whether the alert queue is empty (step 822). If the alert queue is not empty, an alert is issued to the recipient (step 824). If the alert queue is empty, the media item recommendation is not sent to the recipient (step 826).

Figure 15:
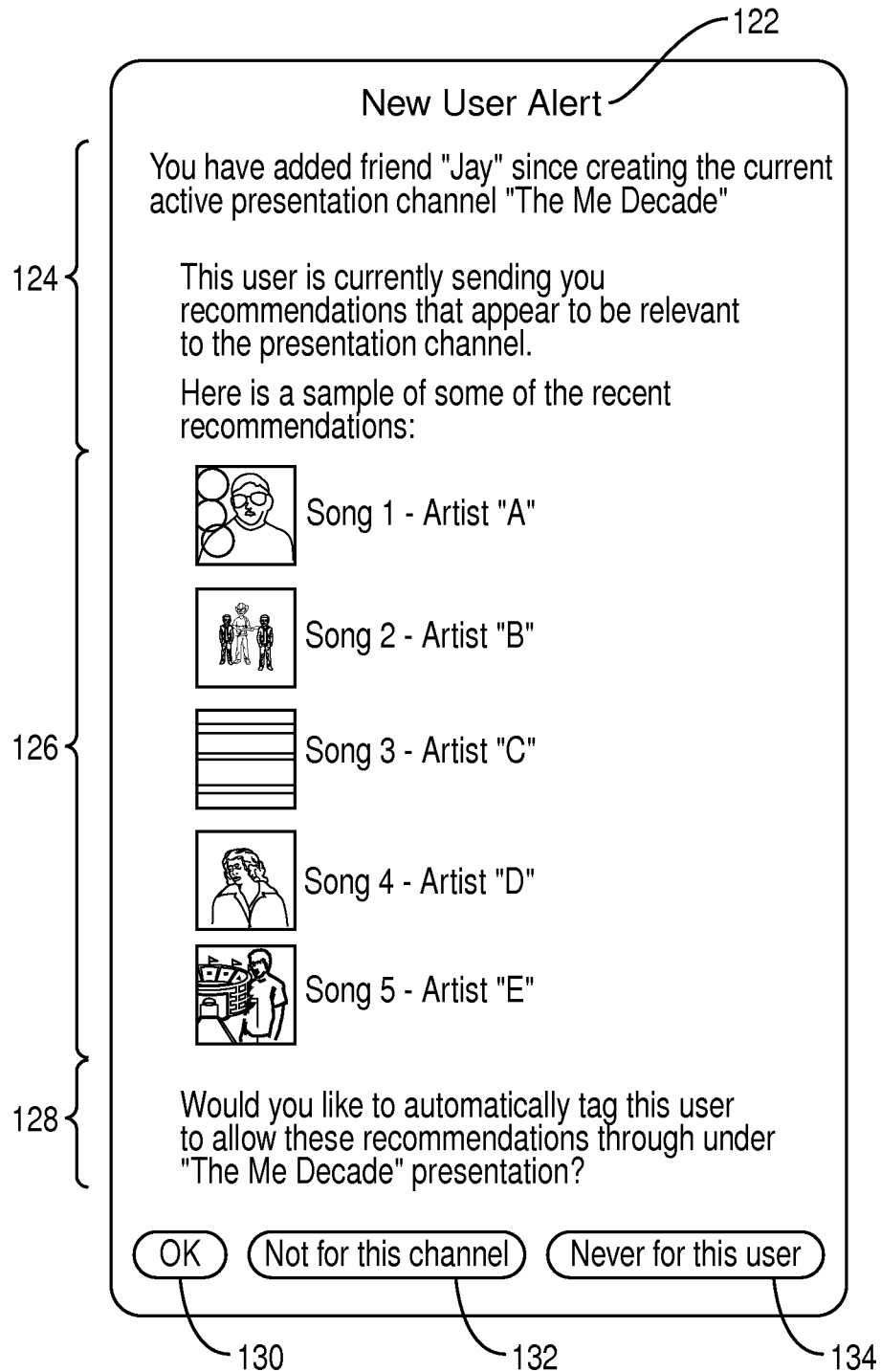
FIG. 15 is an exemplary new user alert GUI illustrating an alert queue and the manner in which the recipient may be advised of media item recommendations of a new recommender, according to an embodiment of the present invention.

The alert queue discussed above may be presented to the recipient in an alert screen and/or window. Such an alert screen and/or window is illustrated in FIG. 15 in the form of a new user alert GUI 122. The new user alert GUI 122 is provided to show the manner in which the recipient may be advised of media item recommendations from a new recommender. The type of media item recommendations sent by a new recommender can be used to suggest to the recipient how the new recommender may be tagged to allow the media item recommendations.

The new user alert GUI 122 may present the recipient with advisory text 124 explaining that a media item recommendation has been sent by a new user. The new user alert GUI 122 may also present a sample of media item recommendations 126 sent by the new user. In this example, the new user is "Jay." The new user alert GUI 122 may then present the recipient with an inquiry 128 as to how the recipient desires to handle the media item recommendation from the new user. For example, the new user alert GUI 122 may advise the recipient that the media item recommendations from "Jay" may fit within "The Me Decade" presentation channel. The new user alert GUI 122 may also request whether the recipient wants to automatically tag "Jay" such that the media item recommendations from "Jay" may be sent through to the recipient when the recipient activates "The Me Decade" presentation channel. The new user alert GUI 122 includes actuators 130, 132, 134 for the recipient to provide a reply. An "OK" actuator 130 may indicate that the recipient desires that "Jay" be automatically tagged so that the media item recommendations may be sent to the recipient under "The Me Decade" presentation channel. Alternatively, the recipient may actuate a "Not for this channel" actuator 132 indicating that the recipient may want to associate a different tag with "Jay" based on other presentation channels in the presentation channel list 30, or define a new presentation channel for "Jay." If the recipient does not desire to be sent "Jay's" media item recommendations, the recipient may actuate a "Never for this user" actuator 134. In such a case, the recipient may delete "Jay" from the friends list 28.

Continuing with the above example, after reviewing the samples of the media item recommendations 126 sent by "Jay," the recipient may determine that he prefers the media item recommendation of Artist "A," but does not prefer any of the other artists of the media items that "Jay" recommended. The recipient may consider "Jay" to be a connoisseur of Artist "A." Therefore, the recipient may decide to associate "Jay" with a recommender tag "Artist 'A'" and define a new presentation channel artist=Artist "A." Additionally, the recipient may name the new presentation channel as "Artist 'A'." Then, if and when the recipient decides that he desires to be sent media item recommendations for Artist "A" from "Jay," the recipient activates the "Artist 'A'" presentation channel. Accordingly, any media item recommendations for Artist "A" sent by "Jay" may be sent to the recipient.

Over time, the recipient may reconsider his decision to limit "Jay's" media item recommendations to just Artist "A." For example, the recipient may have heard from other users in the media item recommendation system 10 that "Jay" may actually be considered a connoisseur of all media items from "The Me Decade" presentation channel. To confirm whether "Jay" is such a connoisseur, the recipient may desire to determine how other users in the media item recommendation system 10 have tagged "Jay." In other words, the recipient may want to review the recommender tags other users in the media item recommendation system 10 may have given to "Jay" as a suggestion of how the recipient should tag "Jay."

The recipient may see how the other users have tagged "Jay," or any other recommender, by opening a screen to display those tags. These tags are shared in essence between the recipients. FIG. 16 illustrates an exemplary screen in the form of a friends recommender tags GUI 136. Based on this sharing, the recipient may determine that he may prefer one of the tags selected for the recommender by another user. In such case, the recipient may adopt that tag. Although in this example, the friends recommender tags GUI 136 shown in FIG. 16 refers to the recommender "Jay," this is for exemplary purposes only. Accordingly, the present invention is not limited to the friends recommender tags GUI 136 referring to "Jay," and there may be a friends recommender tags GUI 136 for other recommenders in the media item recommendation system 10.

The friends recommender tags GUI 136 may comprise a "FRIENDS" field 138 listing the names of the users in the recipient's friends list 28. Fields 140, 142, 144, 146, 148 may list the tags the users have associated with "Jay." The fields may include a "DECADE" field 140, a "GENRE" field 142, an "ARTIST" field 144, a "SOCIAL" field 146, and an "OTHER" field 148. The friends recommender tags GUI 136 shows that "Michael" and "Gene" have tagged "Jay" with the "1980's." The fact that "Michael" and "Gene have tagged "Jay" with the "1980's" may be a sufficient indication to the recipient that "Jay" may be the connoisseur of "The Me Decade" that the recipient has been hearing about. Accordingly, the recipient may decide to adopt the tags that "Michael" and/or "Gene" have associated with "Jay."

The friends recommender tags GUI 136 includes an "ADD" button 150 and a "REPLACE" button 152 for each of the users listed in the "FRIENDS" field 138 to allow the recipient to adopt one or more of the other users' recommender tags. If the recipient elects to adopt another user's recommender tag by adding it to the recipient's existing recommender tag for that recommender, the recipient may do so by actuating the "ADD" button 150 for that particular user. If the recipient elects to adopt the other users' recommender tag by replacing the recipient's existing recommender tag for the recommender with another user's recommender tag for that recommender, the recipient may do so by actuating the "REPLACE" button 152 for that particular user.

In the example of "Jay," after reviewing the friends recommender tags GUI 136, the recipient may decide to adopt the recommender tag that "Michael" has associated with "Jay." The recipient may decide to add "Michael's" recommender tag for "Jay" to the recipient's existing recommender tag for "Jay." Accordingly, the recipient may actuate the "ADD" button 150 for "Michael." By doing so, "Michael's" recommender tag for "Jay" will be added to the recipient's recommender tag for "Jay." The friends recommender tags GUI 136 may also include a "SAVE" button 154. The recipient may actuate the "SAVE" button 154 by clicking on it, for example, to save any action the recipient may have taken. For example, the recipient may actuate the "SAVE" button 154 to save the action the recipient has taken to adopt "Michael's" recommender tag for "Jay." A "CANCEL" button 156 may be included in the friends recommender tags GUI 136. The recipient may actuate the "CANCEL" button 156 by clicking on it, for example, to allow the recipient to cancel any non-saved changes the recipient made the to friends recommender tags GUI 136. Also, a "CLOSE" button 158 may be included. The recipient may actuate the "CLOSE" button 158 by clicking on it, for example, to close the friends recommender tags GUI 136. If the recipient elects to close the friends recommender tags GUI 136 and the recipient has not saved any changes made, a prompt (not shown) may be presented to the recipient to inquire whether the recipient desires to save the changes.

Figure 17:
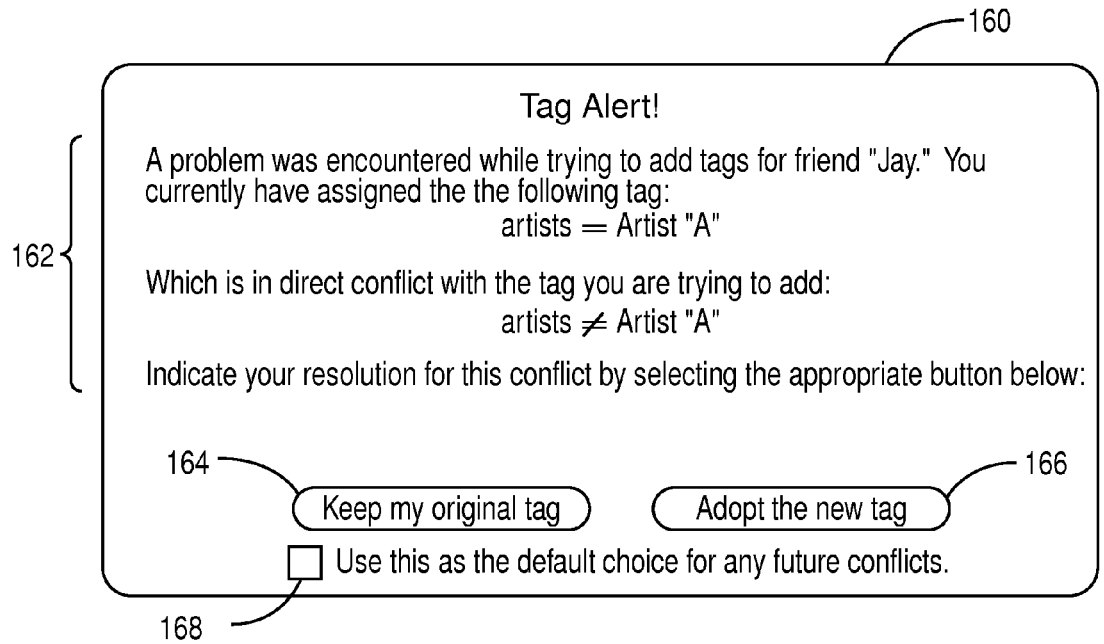
FIG. 17 is an exemplary tag alert GUI illustrating a manner in which a conflict between an existing recommender tag and an adopted recommender tag may be presented to the recipient, according to an embodiment of the present invention.

Upon the recipient actuating the "SAVE" button 154 and the "CLOSE" button 158, the friends recommender tags GUI 136 may close, but the recipient may immediately receive an alert about a tag conflict. A screen may be presented to the recipient indicating that a tag conflict may have occurred as a result of the recipient taking an action involving the friends recommender tags GUI 136. FIG. 17 illustrates an exemplary tag alert GUI 160 informing the recipient of a logical conflict in tags assigned to a recommender. The tag alert GUI 160 may include descriptive text 162 describing the tag conflict. The descriptive text 162 describes the tag conflict as the recipient trying to add a recommender tag that is in conflict with the existing recommender tag. The conflict may involve any of the tags. In this example, the recipient's existing recommender tag for "Jay" included "artist=Artist 'A'." However, the recommender tag the recipient is trying to add included "artist≠Artist 'A'." This occurred because the "ARTIST" field 144 of the friends recommender tags GUI 136 showed that "Michael" included "not Artist 'A'" for "Jay's" recommender tag. The tag conflict resulted because the recipient attempted to add "Michael's" recommender tag for "Jay" to the recipient's existing recommender tag for "Jay."

The tag alert GUI 160 may include actuators 164, 166 to allow the recipient to resolve the tag conflict. The recipient may actuate a "Keep my original tag" actuator 164, and the original recommender tag that the recipient has for "Jay" may remain without "Michael's" recommender tag for "Jay" being adopted. Alternatively, the recipient may actuate an "Adopt the new tag" actuator 166, in which case the tag conflict may be resolved by the recipient's recommender tag for "Jay" changed to agree with "Michael's" recommender tag for "Jay." In other words, in this example, the tag "Artist 'A'" will be changed to "not Artist 'A'." In addition, the tag alert GUI 160 may include a "Default" selector 168. The recipient may use the "Default" selector 168 to set a default selection for any future recommender tag conflicts. The default may then be based on the selection the recipient made when selecting either the "Keep my original tag" actuator 164 or the "Adopt the new tag" actuator 166.

Alternatively, the recipient may have elected to choose another user's recommender tag for "Jay." For example, the recipient may have elected to choose "Gary's" recommender tag for "Jay." "Gary's" recommender tags are shown as "1960's," "1970's," and "not country." The closest presentation channel that the recipient has to "Gary's" recommender tags may be the "New Non-Country" presentation channel, for example. However, the "New Non-Country" presentation channel is defined by the criteria "decade=1990's" or "decade=2000's" and "genre≠country." Accordingly, the recipient may not have defined a presentation channel that matches the adopted recommender tag. In such a case, a new tag alert may be presented to the recipient.

Figure 18:
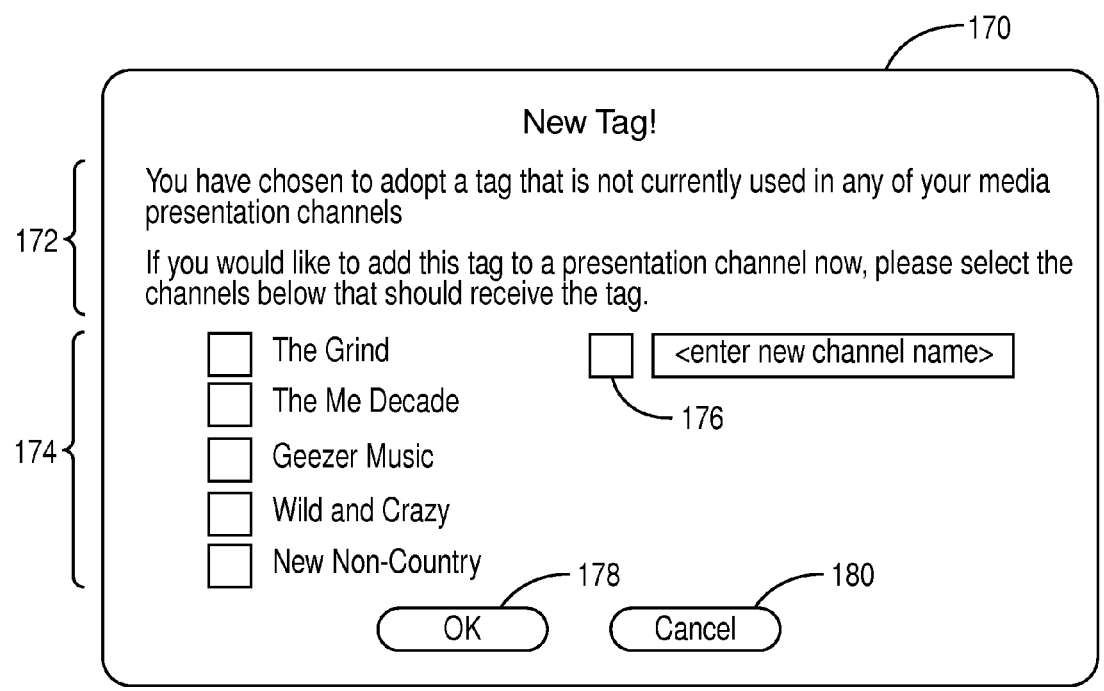
FIG. 18 is an exemplary new tag alert GUI illustrating a manner in which the recipient may be alerted when a recommender tag that the recipient intends to adopt does not match the selected presentation channel, according to an embodiment of the present invention.

FIG. 18 illustrates an exemplary new tag alert GUI 170 that may be presented to the recipient when a recommender tag the recipient intends to adopt does not match an existing presentation channel. The new tag alert GUI 170 may include a descriptive text 172 describing the alert to the recipient and a selection field 174. The selection field 174 may provide several selectors for the recipient to elect the manner in which to resolve the new tag alert. For example, the selection field 174 may provide the recipient with the choice of having the new tag fit into an existing presentation channel. In such a case, the presentation channel may be re-defined by the criterion matching the new recommender tag. Alternatively, a new channel name field 176 may provide the recipient with the choice of defining a new presentation channel.

The new tag alert GUI 170 may also include an "OK" actuator 178 and a "Cancel" actuator 180. If the recipient actuates the "OK" actuator 178, the recipient's choice may be accepted and implemented, and the new tag alert GUI 170 may close. If the recipient actuates the "Cancel" actuator 180, the recipient's choice may be discarded and the new tag alert GUI 170 may remain open until the recipient makes another choice and actuates the "OK" actuator 178.

The GUIs discussed above are presented to the recipient through the user device 14. In this manner, the recipient may interact with the media item recommendation system 10 and other users in the media item recommendation system 10. Also, the recipient may receive the services and information provided by and through the central server 12. Accordingly, the central server 12 and the user device 14 comprise the necessary components to allow the user, as recipient and/or recommender, to perform functions associated with the media item recommendation system 10.

The functionality of the present invention can be embodied in any computer-readable medium for use by or in connection with a computer-related system or method. In the context of the present invention, a computer-readable medium is an electronic, magnetic, optical, semiconductor, or other device or means that can transmit, contain, or store computer instructions, programs, or data for use by or in connection with a computer-related system or method.

Those skilled in the art will recognize improvements and modifications to the preferred embodiments of the present invention. All such improvements and modifications are considered within the scope of the concepts disclosed herein and the claims that follow.

What is claimed is:

1. A method of filtering recommenders in a media item recommendation system, comprising the steps of:
    receiving a media item recommendation for a media item sent from a recommender to a recipient;
    determining whether at least one tag of a plurality of tags associated with the recommender matches a current selection criterion established by the recipient, the at least one tag characterizing at least one of the recommender and the media item;
    sending the media item recommendation to the recipient if the at least one tag of the plurality of tags associated with the recommender matches the current selection criterion wherein the media item recommendation is not sent to the recipient if the at least one tag does not match the current selection criterion;
    determining if any one of the plurality of tags logically conflicts with another of the plurality of tags by determining that the any one of the plurality of tags is mutually exclusive with any other of the plurality of tags; and
    providing an alert to the recipient if there is a logical conflict between any of the plurality of tags.

2. The method of claim 1, wherein the tag comprises one of a social relationship attribute and a media item attribute.

3. The method of claim 1, wherein the current selection criterion is comprised of either a criterion describing a social relationship between the recipient and the recommender, a media item attribute, or both a criterion describing a social relationship between the recipient and the recommender and a media item attribute.

4. The method of claim 1, wherein the current selection criterion describes a media item attribute, and the sending the media item recommendation comprises sending the media item recommendation to the recipient if the at least one tag and type of the media item recommendation match the current selection criterion.

5. The method of claim 1, wherein the current selection criterion defines a presentation channel.

6. The method of claim 5, further comprising activating the presentation channel, wherein the activating establishes the current selection criterion.

7. The method of claim 1, wherein the current selection criterion defines a presentation channel and further comprising not allowing the presentation channel to be activated until the at least one tag among the plurality of tags matches the current selection criterion selected for the presentation channel.

8. The method of claim 1, further comprising removing the alert if the tag or tags among the plurality of tags causing the logical conflict is removed.

9. The method of claim 1, wherein the current selection criterion is one of a plurality of current selection criteria established by the recipient, and wherein sending the media item recommendation comprises sending the media item recommendation to the recipient if the plurality of tags match one or more of the plurality of current selection criteria.

10. The method of claim 9 wherein:
    determining whether a tag associated with the recommender matches a current selection criterion established by the recipient comprises determining whether the plurality of tags associated with the recommender matches more than one of the plurality of current selection criteria established by the recipient; and
    sending the media item recommendation to the recipient comprises sending the media item recommendation to the recipient if the plurality of tags associated with the recommender match the more than one of the plurality of current selection criteria established by the recipient and the media item recommendation is not sent if the plurality of tags do not match the more than one of the plurality of current selection criteria established by the recipient.

11. The method of claim 9, wherein:
    determining whether a tag associated with the recommender matches a current selection criterion established by the recipient comprises determining whether the plurality of tags associated with the recommender match all of the plurality of current selection criteria established by the recipient; and
    sending the media item recommendation to the recipient comprises sending the media item recommendation to the recipient if the plurality of tags associated with the recommender match the all of the plurality of current selection criteria established by the recipient and the media item recommendation is not sent to the recipient if the plurality of tags do not match the all of the plurality of current selection criteria established by the recipient.

12. The method of claim 1, further comprising:
    determining if an operational conflict exists for the recommender; and
    providing a prompt to the recipient if the operational conflict is determined to exist.

13. The method of claim 12, further comprising removing the prompt if the recipient receives the media item recommendation from the recommender.

14. The method of claim 1, further comprising sharing with the recipient a tag associated with the recommender by a second recipient.

15. The method of claim 1, wherein the media item recommendation is not sent to the recipient if none of the plurality of tags match the current selection criterion.

16. The method of claim 1, further comprising:
    prior to determining whether the at least one tag associated with the recommender matches the current selection criterion, receiving a recommendation request from the recipient.

17. A system for filtering recommenders in a media item recommendation system, comprising:
    a control system, wherein the control system is adapted to:
        receive a media item recommendation for a media item sent from a recommender to a recipient;
        determine whether at least one tag of a plurality of tags associated with the recommender matches a current selection criterion established by the recipient, the at least one tag characterizing at least one of the recommender and the media item;
        send the media item recommendation to the recipient if the at least one tag of the plurality of tags associated with the recommender matches the current selection criterion wherein the media item recommendation is not sent to the recipient if the at least one tag does not match the current selection criterion;
        determine if any one of the plurality of tags logically conflicts with another of the plurality of tags by determining that the any one of the plurality of tags is mutually exclusive with any other of the plurality of tags; and provide an alert to the recipient if there is a logical conflict between any of the plurality of tags.

18. The system of claim 17, wherein the at least one tag comprises one of a social relationship attribute and a media item attribute.

19. The system of claim 17, wherein the current selection criterion describes a social relationship between the recipient and the recommender.

20. The system of claim 17, wherein the current selection criterion describes a media item attribute, and wherein the control system is adapted to send the media item recommendation to the recipient if the at least one tag and the media item attribute match the current selection criterion.

21. The system of claim 17, wherein the current selection criterion defines a presentation channel.

22. The system of claim 21, wherein the control system is further adapted to activate the presentation channel, wherein activating the presentation channel establishes the current selection criterion.

23. The system of claim 17, wherein the current selection criterion is one of a plurality of current selection criteria, and wherein the control system is adapted to send the media item recommendation to the recipient if the plurality of tags matches one or more of the plurality of the current selection criteria.

24. A non-transitory computer-readable medium comprising instructions for instructing a computer to:

receive a media item recommendation for a media item sent from a recommender to a recipient;

determine whether at least one tag of a plurality of tags associated with the recommender matches a current selection criterion established by the recipient, the at least one tag characterizing at least one of the recommender and the media item;

send the media item recommendation to the recipient if the at least one tag of the plurality of tags associated with the recommender matches the current selection criterion wherein the media item recommendation is not sent to the recipient if the at least one tag does not match the current selection criterion; and determine if any one of the plurality of tags logically conflicts with another of the plurality of tags by determining that the any one of the plurality of tags is mutually exclusive with any other of the plurality of tags; and provide an alert to the recipient if there is a logical conflict between any of the plurality of tags.

25. The non-transitory computer-readable medium of claim 24, wherein the current selection criterion describes a media item attribute, and wherein at least one instruction from the instructions are operable to instruct the computer to send the media item recommendation to the recipient if the at least one tag and type of the media item match the current selection criterion.

* * * * *